United States Patent
He et al.

(10) Patent No.: US 11,985,726 B2
(45) Date of Patent: May 14, 2024

(54) CHANNEL STATE INFORMATION (CSI) REPORTING DURING A DISCONTINUOUS RECEPTION (DRX) CYCLE

(71) Applicant: QUALCOMM INCORPORATED, San Diego, CA (US)

(72) Inventors: Linhai He, San Diego, CA (US); Wooseok Nam, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 16/949,439

(22) Filed: Oct. 29, 2020

(65) Prior Publication Data

US 2021/0136862 A1     May 6, 2021

Related U.S. Application Data

(60) Provisional application No. 62/930,452, filed on Nov. 4, 2019.

(51) Int. Cl.
*H04W 76/28*     (2018.01)
*H04B 17/318*     (2015.01)
(Continued)

(52) U.S. Cl.
CPC .......... *H04W 76/28* (2018.02); *H04B 17/318* (2015.01); *H04L 5/0048* (2013.01);
(Continued)

(58) Field of Classification Search
CPC . H04W 76/28; H04W 24/08; H04W 52/0235; H04W 72/0413; H04W 52/0216;
(Continued)

(56) References Cited

U.S. PATENT DOCUMENTS 9,198,071 B2    11/2015   Geirhofer et al.
2009/0238121 A1*   9/2009   Kotecha ................ H04L 5/0057
                                                             370/329
(Continued)

FOREIGN PATENT DOCUMENTS

CN       104956717 A    9/2015
WO     2013142089 A1   9/2013

OTHER PUBLICATIONS

International Search Report and Written Opinion—PCT/US2020/058147—ISA/EPO—Feb. 24, 2021.
(Continued)

*Primary Examiner* — Ian N Moore
*Assistant Examiner* — Sun Jong Kim
(74) *Attorney, Agent, or Firm* — Haynes and Boone, LLP/Qualcomm Incorporated

(57) ABSTRACT

Wireless communication devices, systems, and methods related to communicating CSI reports during a discontinuous reception (DRX) are provided. A method of wireless communication includes performing one or more measurements of one or more reference signals configured for a user equipment (UE). The method includes triggering transmission of a channel state information (CSI) report during a DRX cycle. The method includes transmitting to a base station (BS), the CSI report based on the triggering, the CSI report including the one or more measurements.

28 Claims, 13 Drawing Sheets

(51) Int. Cl.
*H04L 5/00* (2006.01)
*H04W 24/08* (2009.01)
*H04W 52/02* (2009.01)
*H04W 72/21* (2023.01)

(52) U.S. Cl.
CPC ....... *H04W 24/08* (2013.01); *H04W 52/0235* (2013.01); *H04W 72/21* (2023.01)

(58) Field of Classification Search
CPC .......... H04W 24/10; H04W 52/0229; H04B 17/318; H04B 17/327; H04B 7/0408; H04B 7/0695; H04B 7/0626; H04L 5/0048; H04L 5/0057; H04L 5/0094; Y02D 30/70
See application file for complete search history.

(56) References Cited

U.S. PATENT DOCUMENTS

| | | | | |
|---|---|---|---|---|
| 2015/0271694 | A1* | 9/2015 | Jung | H04W 24/10 370/328 |
| 2016/0157256 | A1* | 6/2016 | Tseng | H04W 72/1284 370/329 |
| 2017/0303265 | A1* | 10/2017 | Islam | H04B 7/0695 |
| 2018/0242243 | A1* | 8/2018 | Kela | H04L 5/0057 |
| 2018/0332655 | A1* | 11/2018 | Ang | H04W 52/0229 |
| 2019/0037495 | A1 | 1/2019 | John Wilson et al. | |
| 2019/0215896 | A1 | 7/2019 | Zhou et al. | |
| 2019/0254110 | A1* | 8/2019 | He | H04L 5/0048 |
| 2019/0260461 | A1* | 8/2019 | Kim | H04B 7/15592 |
| 2019/0281546 | A1* | 9/2019 | Lim | H04L 1/0027 |
| 2019/0296854 | A1* | 9/2019 | Kubo | H04W 80/02 |
| 2019/0394758 | A1* | 12/2019 | Cheng | H04W 76/27 |
| 2021/0028844 | A1* | 1/2021 | Song | H04W 76/28 |
| 2021/0185609 | A1* | 6/2021 | Zhou | H04W 52/0219 |
| 2021/0337453 | A1* | 10/2021 | Gao | H04B 7/0695 |
| 2022/0225151 | A1* | 7/2022 | Zhang | H04W 52/0229 |

OTHER PUBLICATIONS

Moderator (Apple): "Feature Lead Summary #2 on L1-SINR and SCell BFR", 3GPP TSG RAN WG1 #100b, 3GPP Draft; R1-2002340, 3rd Generation Partnership Project (3GPP), Mobile Competence Centre; 650, Route Des Lucioles; F-06921 Sophia-Antipolis Cedex, France, vol. RAN WG1, No. e-Meeting; Apr. 20, 2020-Apr. 30, 2020, Apr. 18, 2020 (Apr. 18, 2020), 18 Pages, XP051876649, Retrieved from the Internet: URL: https://ftp.3gpp.org/tsg_ran/WG1_RL1/TSGR1_100b_e/Docs/R1-2002340.zip R1-2002340 Feature Lead Summary on L1SINR and SCell BFR.docx [retrieved on Apr. 18, 2020] the whole document.

Qualcomm Inc: "Clarification on CSI Reporting in C-DRX", 3GPP TSG-RAN WG2 Meeting #107bis, 3GPP Draft; 38321_CR0672R2_(REL-15)_R2-1914175_Clarification on CSI Reporting in C-DRX, 3rd Generation Partnership Project (3GPP), Mobile Competence Centre; 650, Route Des Lucioles; F-06921 Sophia-A, vol. RAN WG2, No. Chongqing, China; Oct. 14, 2019-Oct. 18, 2019, Oct. 18, 2019 (Oct. 18, 2019), 7 Pages, XP051797948, Retrieved from the Internet: URL: https://ftp.3gpp.org/tsg_ran/WG2_RL2/TSGR2_107bis/Docs/R2-1914175.zip 38321_CR0672r2_(Rel-15)_R2-1914175_Clarification on CSI reporting in C-DRX.docx [retrieved on Oct. 18, 2019] p. 1, p. 2, last two paragraphs, p. 3, line 3-line 7, p. 5, line 17-line 24.

RAN4: "[draft] LS on CSI-RS Measurement Outside DRX Active Time", 3GPP TSG-RAN4 Meeting #92bis, 3GPP Draft; R4-1911953, 3rd Generation Partnership Project (3GPP), Mobile Competence Centre, 650, Route Des Lucioles; F-06921 Sophia-Antipolis Cedex, France, vol. RAN WG4, No. Chongqing, China; Oct. 14, 2019-Oct. 18, 2019, 1 Page, Oct. 4, 2019 (Oct. 4, 2019), XP051806692, Retrieved from the Internet: URL: https://ftp.3gpp.org/tsg_ran/WG4_Radio/TSGR4_92Bis/Docs/R4-1911953.zip R4-1911953.doc [retrieved on Oct. 4, 2019] Section 1.

* cited by examiner

CHANNEL STATE INFORMATION (CSI) REPORTING DURING A DISCONTINUOUS RECEPTION (DRX) CYCLE

TECHNICAL FIELD

The present application claims priority to and the benefit of U.S. Provisional Patent Application No. 62/930,452 filed Nov. 4, 2019, which is hereby incorporated by reference in its entirety as if fully set forth below and for all applicable purposes.

TECHNICAL FIELD

This application relates to wireless communication systems, and more particularly to methods (and associated devices and systems) for channel state information (CSI) reporting during a discontinuous reception (DRX) cycle.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum.

Additionally, due to the power demands on wireless communication devices associated with voice, video, packet data, messaging, broadcast, and other communications, there is a desire to limit usage of device components and save power when possible. Discontinuous reception (DRX) is a technique in which a UE may be in DRX inactive time or DRX active time during a DRX cycle. The DRX inactive time allows the UE to power down certain radio components or at least switch certain radio components to a lower power state than when in an active state. Accordingly, the use of DRX can provide power savings at the UE.

While operating in the DRX mode, it may be desirable for the UE to transmit CSI reports to the BS. The BS may use the CSI report to determine whether to reconfigure the UE's beams.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of the present disclosure provide solutions for how a user equipment (UE) can transmit a channel state information (CSI) report during a discontinuous reception (DRX) cycle, even if the UE is not scheduled for reception of DL data in a next occurrence of a DRX cycle. In some aspects, the UE autonomously triggers transmission of the CSI report. In some aspects, the UE determines during a DRX inactive time, to transmit the CSI report.

In an aspect of the disclosure, a method of wireless communication includes performing, by a user equipment (UE), one or more measurements of one or more reference signals configured for the UE; triggering, by the UE, transmission of a channel state information (CSI) report during a discontinuous reception (DRX) cycle; and transmitting, by the UE to a base station (BS), the CSI report based on the triggering, the CSI report including the one or more measurements.

In an aspect of the disclosure, a method of wireless communication includes determining, by a UE during a DRX inactive time, to transmit a CSI report; and transmitting, by the UE to a BS, the CSI report based on the determining.

In an aspect of the disclosure an apparatus includes a processor configured to: perform, by a UE, one or more measurements of one or more reference signals configured for the UE; and trigger, by the UE, transmission of a CSI report during a DRX cycle; and a transceiver configured to: transmit, by the UE to a BS, the CSI report based on the triggering, the CSI report including the one or more measurements.

In an aspect of the disclosure, an apparatus includes a processor configured to determine, by a UE during a DRX inactive time, to transmit a CSI report; and a transceiver configured to transmit, by the UE to a BS, the CSI report based on a determination during the DRX inactive time to transmit the CSI report.

In an aspect of the disclosure, a computer-readable medium having program code recorded thereon, the program code including: code for causing a UE to perform one or more measurements of one or more reference signals configured for the UE; code for causing the UE to trigger transmission of a CSI report during a DRX cycle; and code for causing the UE to transmit to a BS, the CSI report based on the triggering, the CSI report including the one or more measurements.

In an aspect of the disclosure, a computer-readable medium having program code recorded thereon, the program code including: code for causing a UE determine during a DRX inactive time, to transmit a CSI report; and code for causing the UE to transmit to a BS, the CSI report based on the determining.

In an aspect of the disclosure, an apparatus includes means for performing one or more measurements of one or more reference signals configured for a UE; means for triggering transmission of a CSI report during a DRX cycle; and means for transmitting to a BS, the CSI report based on the triggering, the CSI report including the one or more measurements.

In an aspect of the disclosure, an apparatus includes means for determining during a DRX inactive time, to transmit a CSI report; and means for transmitting to a BS, the CSI report based on the determining.

In an aspect of the disclosure, a method of wireless communication includes configuring, by a BS, one or more DRX cycles for a UE; and receiving, by the BS from the UE, a CSI report from the UE when the BS has no DL data scheduled for the UE in a next occurrence of a DRX cycle.

In an aspect of the disclosure an apparatus includes a processor configured to configure, by a BS, one or more DRX cycles for a UE; and a transceiver configured to transmit, by the UE to a BS, the CSI report based on the triggering, the CSI report including the one or more measurements.

In an aspect of the disclosure, a computer-readable medium having program code recorded thereon, the program code including: code for causing a BS to configure one or more DRX cycles for a UE; and code for causing the BS to receive from the UE, a CSI report from the UE when the BS has no DL data scheduled for the UE during a next occurrence of a DRX cycle.

In an aspect of the disclosure, an apparatus includes means for configuring one or more DRX cycles for a UE; and means for receiving from the UE, a CSI report from the UE when the UE is not scheduled for reception of DL data during the next occurrence of a DRX cycle.

Other aspects, features, and advantages of the present disclosure will become apparent to those of ordinary skill in the art, upon reviewing the following description of specific, exemplary aspects of the present disclosure in conjunction with the accompanying figures. While features of the present disclosure may be discussed relative to certain examples and figures below, all aspects of the present disclosure can include one or more of the advantageous features discussed herein. In other words, while one or more embodiments may be discussed as having certain advantageous features, one or more of such features may also be used in accordance with the various other embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
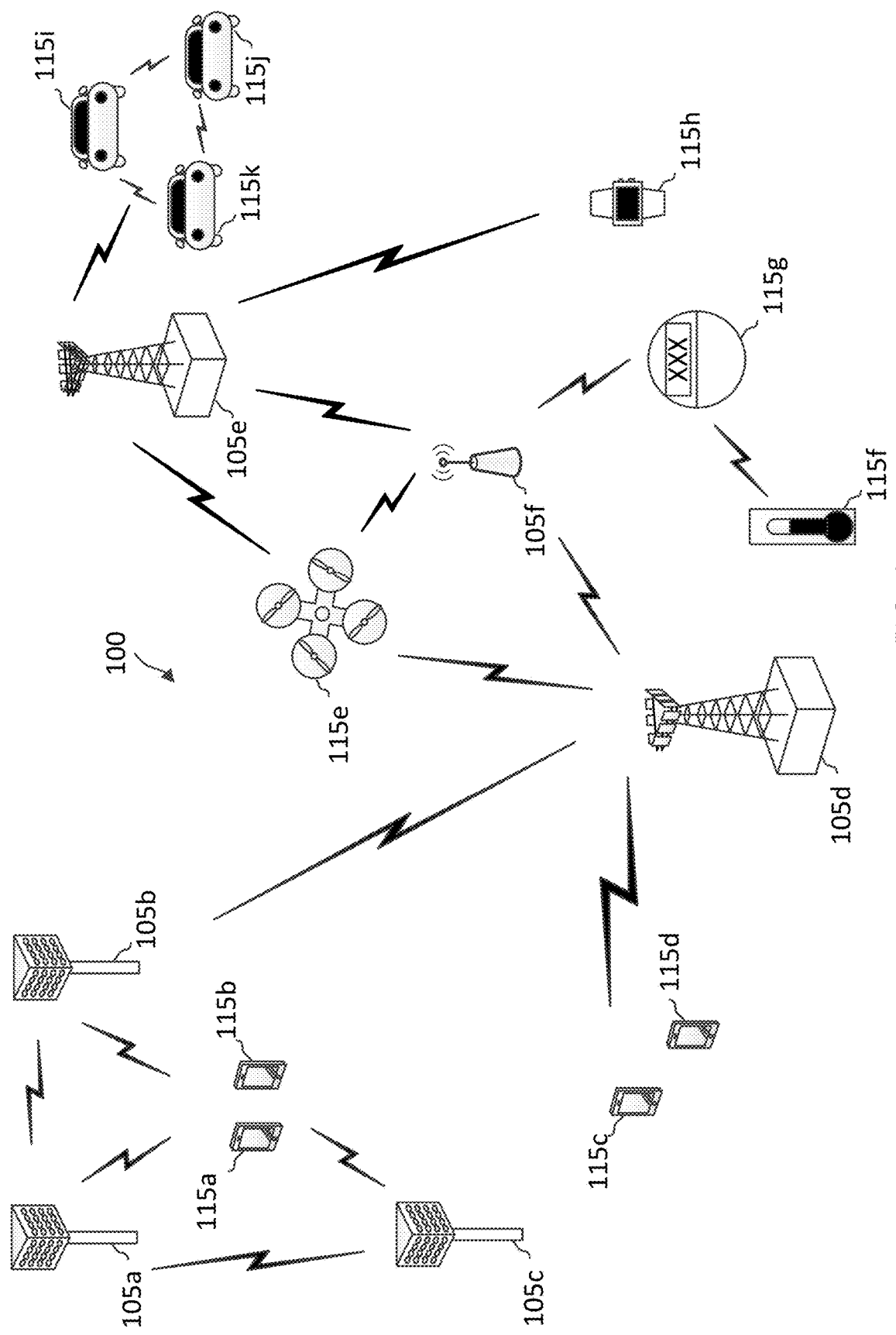
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

A wireless channel between the network (e.g., a BS) and a UE may vary over time. The BS may configure a set of beams for the UE, which at any point of time may use one or two serving beams to receive DL transmissions from or transmit UL transmissions to the BS. The BS and the UE may keep track of the serving beam(s) as well as candidate beams. For example, the UE may perform one or more measurements of one or more reference signals configured for the UE and may include the one or more measurements in a CSI report. If a serving beam fails, the BS may reconfigure the UE to use of the candidate beams. Candidate beams may be regularly updated because the channel quality between the BS and the UE may change over time. It may be desirable for the UE update the serving beam(s) according to the channel state. The UE may report the link quality of the serving beam(s) and the candidate beams in a CSI report to the BS, and the BS may process the CSI report and determine whether the UE's serving beam(s) or candidate beam(s) should be reconfigured. If the quality of a beam falls below a threshold, the BS may reconfigure a beam the UE's serving beam(s) or candidate beam(s). The BS may configure the threshold. Based on the determination, the BS may transmit a command to reconfigure the UE's serving beam (s) and/or candidate beam(s) in response to the CSI report.

The BS may configure the UE to periodically report the CSI report to the BS. The CSI report may include, for example, channel quality information (CQI) and/or L1-reference signal received power (RSRP). CQI is an indicator carrying information on the quality of a communication channel. The BS may use the CQI to assist in downlink (DL) scheduling. The BS may use the L1-RSRP to manage beams in multi-beam operations. The UE may perform different combinations of measurements for inclusion in the CSI report. Accordingly, the UE may transmit a CSI report including the CQI but not the L1-RSRP, a CSI report including the L1-RSRP but not the CQI, and/or a CSI report including both the CQI and the L1-RSRP.

In a wireless communication network, DRX is a technique in which a UE may enter a sleep mode for a certain period of time and enter a wake mode for another period of time. While the UE is in a DRX active time, the UE may monitor for physical DL control channel (PDCCH) from a serving BS and decode PDCCH received from the BS. While the UE is in a DRX inactive time, the UE may not monitor for PDCCH, thus allowing the UE to power down certain radio components or at least switch certain radio components to a lower power state than an active state. Accordingly, the use of DRX can provide power savings at the UE. At a beginning of each DRX cycle, the UE wakes up again and repeats the process. In the present disclosure, the terms "sleep state" and "DRX inactive time" may be used interchangeably.

While the UE is operating in the DRX mode, the UE may report the CSI while the UE is in DRX active time. The BS may configure a deterministic set of starting times for DRX cycles in the time domain and may configure the UE to transmit the CSI report. The BS may transmit a wake-up signal (WUS) signaling (or lack thereof) to the UE whether the UE should wake up for the next occurrence of a DRX cycle. The BS may transmit the WUS indicating that the UE should wake up if the UE has been scheduled for reception of DL data during the next occurrence of a DRX cycle. If the UE receives an indication to wake up, the UE enters a DRX active time. If the UE enters the DRX active time and is configured to report CSI, the UE may transmit the CSI over configured resources. When the UE no longer has UL data to transmit or DL data to receive, the UE may enter the DRX inactive time. Lack of receiving the WUS by the UE may indicate that it is unnecessary for the UE the wake up because the UE has not been scheduled for reception of DL data during a next occurrence of a DRX cycle. If the UE does not receive any indication to wake up, the UE does not enter the DRX active time. Accordingly, even if the UE is configured to report CSI, the UE does not report CSI for an entire DRX cycle. While the UE is in the DRX inactive time, the UE does not report CSI. Additionally, the UE may enter a wake state, which is different from the DRX active time. The wake state may be "in between" the DRX active time and the DRX inactive time, where when the UE is in the wake state, the UE is not fully powered up such as when in the DRX active time, but can perform measurements and reporting. Additionally, the UE does not monitor for PDCCH while the UE is in the wake state.

The present disclosure provides techniques for the UE to transmit the CSI report while the UE is operating in the DRX mode. In some aspects, the UE may autonomously trigger transmission of the CSI report, without regard to the WUS indication. In some aspects, the UE may determine to transmit the CSI report while the UE is in the DRX inactive time. The UE may enter the wake state or the DRX active time and accordingly transmit the CSI report. The BS receives the CSI report and determines, based on the information in the CSI report, whether to reconfigure the UE's serving beam(s) and/or candidate beam(s).

These and other aspects of the present disclosure can provide several benefits. For example, the UE may wake up to transmit a CSI report even if the UE is not scheduled for reception of DL data during the next occurrence of a DRX cycle. Accordingly, it may be unnecessary for the UE to wait until the next DRX cycle (or until the UE is scheduled for reception of DL data during the next occurrence of a DRX cycle), which may be several hundred milliseconds (ms), to transmit the CSI report. The BS may determine, based on the CSI report, the signal strength of the beams used by the BS and accordingly determine whether to reconfigure the UE's beams. The reconfigured beams may assist in maintaining a strong link between the UE and the BS. Additionally, while the UE is in a sleep mode as part of a DRX operation, the power consumption by the UE may be reduced and battery life may be increased. Additional features and benefits of the present disclosure are set forth in the following description.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) communications among the UEs 115i-115k, vehicle-to-everything (V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. A subframe may also be referred to as a slot. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. In some aspects, the BS 105 may communicate with a UE 115 using HARQ techniques to improve communication reliability, for example, to provide a URLLC service.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities.

Figure 2:
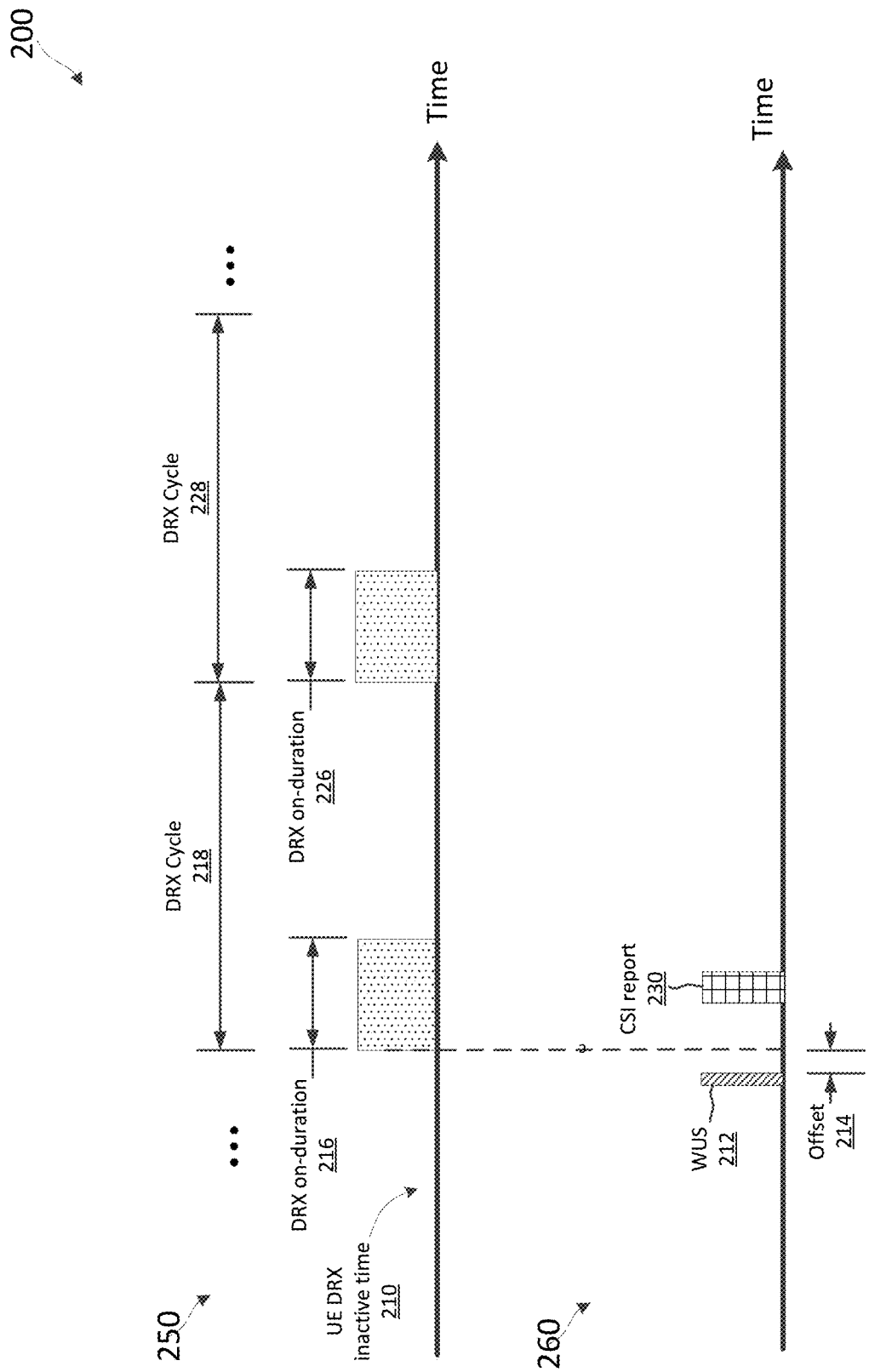
FIG. 2 illustrates a scheduling/transmission configuration of a wireless communication method according to some aspects of the present disclosure.

FIG. 2 illustrates a scheduling/transmission configuration 200 of a wireless communication method according to some aspects of the present disclosure. The scheduling/transmission configuration 200 may be employed by BSs such as the BSs 105 and UEs such as the UEs 115 in a network such as the network 100 for communications. In particular, the BS may communicate with the UE using time-frequency resources configured as shown in the scheduling/transmission configuration 200. In FIG. 2, the x-axis represents time in some arbitrary units.

While operating the DRX mode, the UE may be in a DRX inactive time or a DRX active time. While the UE is in the DRX inactive time, the UE may not monitor for PDCCH, thus allowing the UE to power down certain radio components or at least switch certain radio components to a lower power state than an active state. While the UE is in the DRX active time, the UE may monitor for PDCCH from a serving BS and decode PDCCH received from the BS. Additionally, the UE may enter a wake state during which the UE may perform certain functions such as performing one or more measurements of one or more reference signals configured for the UE or data transmission (e.g., transmission of a CSI report), but does not monitor for PDCCH. The DRX mode may have a certain duty cycle with an active/on-period or an inactive/sleep-period. A UE may transmit a CSI report 230 while operating in a DRX mode in accordance with the present disclosure.

The scheduling/transmission configuration 200 may include a DRX cycle 218 including the DRX on-duration 216. FIG. 2 includes a graph 250 and a graph 260. As shown in the graph 250, at 210, the UE is in DRX inactive time. A DRX cycle 218 may start with a DRX on-duration 216, which is deterministic and of a fixed time period. The DRX cycle 218 may also be fixed. The BS may configure a deterministic set of starting times for DRX cycles in the time domain. For example, a DRX cycle may be 100 ms, and the DRX on-duration may be 10 ms. In this example, the DRX cycle may start every 0 ms (e.g., DRX cycle 218 including the DRX on-duration 216), 100 ms (e.g., DRX cycle 228 including a DRX on-duration 226), 200 ms, and so on.

Referring to the graph 260, the BS may transmit a WUS 212 at an offset 214 before a start of the DRX on-duration 216 of the DRX cycle 218. The offset 214 may allow the UE to power up certain radio components or at least switch certain radio components to a higher power state than in the DRX inactive time. The WUS may be transmitted via PDCCH or other suitable signaling. If the WUS 212 indicates that the UE is scheduled for reception of DL data in a next occurrence of a DRX on-duration (e.g., DRX on-duration 216), the UE may start a DRX activity timer. As long as the DRX activity timer is running, the UE may be considered to be in the DRX active time. When the UE receives a new DL transmission or transmits a new UL transmission, the UE may reset the DRX activity timer. If the data continues to flow (e.g., the UE continues to receive new DL or transmit new UL transmissions), the UE may remain in the DRX active time because the DRX activity timer continues to run due to the UE resetting the DRX activity timer. When the UE has no more DL data to receive or UL data to transmit, the UE will not reset the DRX activity timer, which will eventually expire. When the DRX activity timer expires, the UE terminates or exits the DRX active time and enters DRX inactive time. The time duration of the DRX inactive time is not fixed and is dependent on when the UE terminates the DRX active time. The UE may continue this deterministic on-and-off pattern.

The WUS 212 may provide an indication to the UE to transmit a CSI report 230. The UE may receive the WUS 212 and accordingly transmit the CSI report as discussed in the present disclosure. As discussed in further detail below, the WUS 212 may indicate other aspects to the UE, such as whether the UE is scheduled for reception of DL data in a next occurrence of a DRX on-duration or providing an indication to the UE to enter a particular state (e.g., a DRX active time or wake state) to transmit the CSI report. In the present disclosure, even if the WUS 212 provides an indication that the UE is not scheduled for reception of DL data in a next occurrence of a DRX on-duration, the UE may still transmit the CSI report 230 in response to the WUS 212 providing an indication to the UE to transmit the CSI report 230. Accordingly, the UE may continue to report CSI to the BS during a DRX cycle, even if the UE is not scheduled for reception of DL data in a next occurrence of a DRX on-duration.

In some aspects, the UE may autonomously trigger transmission of the CSI report 230, which may trigger the BS to reconfigure the UE's serving beam and/or candidate beam. For example, the UE may transmit the CSI report 230 even if the WUS 212 indicates that the UE is not scheduled for reception of DL data during the DRX on-duration 216. More details regarding the autonomous triggering of the CSI report transmission are discussed below in relation to, for example, aspects of FIGS. 3-7, 11, and 13.

In some aspects, the UE may determine to transmit the CSI report while the UE is in the DRX inactive time. For example, the WUS 212 may provide an indication to the UE to enter a given state to transmit the CSI report. The given state may be, for example, the wake state or the DRX active time. The UE enters the given state in accordance with the WUS 212 and transmits the CSI report while in the given state. The BS may receive the CSI report 230 and determine whether to reconfigure the UE's serving beam and/or candidate beam. More details regarding the transmission of the CSI report are discussed below in relation to, for example, aspects of FIGS. 3-5, 8-10, 12, and 13.

Figure 3:
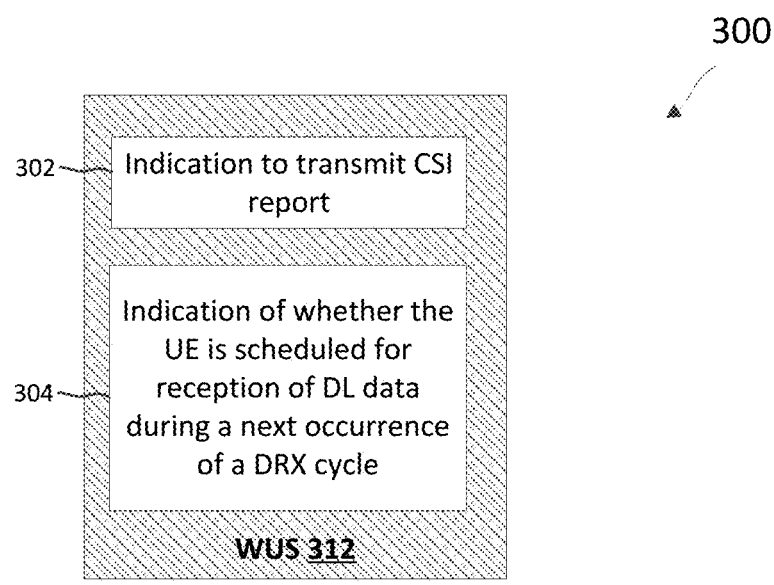
FIG. 3 illustrates a WUS configuration according to some aspects of the present disclosure.

FIG. 3 illustrates a WUS configuration 300 according to some aspects of the present disclosure. The WUS configuration 300 may be employed by BSs such as the BSs 105 and UEs such as the UEs 115 in a network such as the network 100 for communications. The BS may transmit a WUS 312 to the UE, and the UE may receive the WUS 312. The WUS 312 may correspond to WUS 212 in FIG. 2.

The WUS 312 may provide an indication 302 and/or an indication 304. The indication 302 may be an indication to transmit the CSI report. The indication 304 may be an indication of whether the UE is scheduled for reception of DL data during the next occurrence of a DRX cycle. If the UE receives the WUS 312 having the first indication 302, the UE may determine to exit the DRX inactive time, enter a wake state or a DRX active time, and transmit the CSI report while in the given state (e.g., wake state or DRX active time). The UE may transmit the CSI report regardless if the second indication 304 indicates that the UE is not scheduled for reception of DL data during the next occurrence of a DRX cycle. In some aspects, the UE may use the WUS 312 as an indication to transmit the CSI report.

Figure 4:
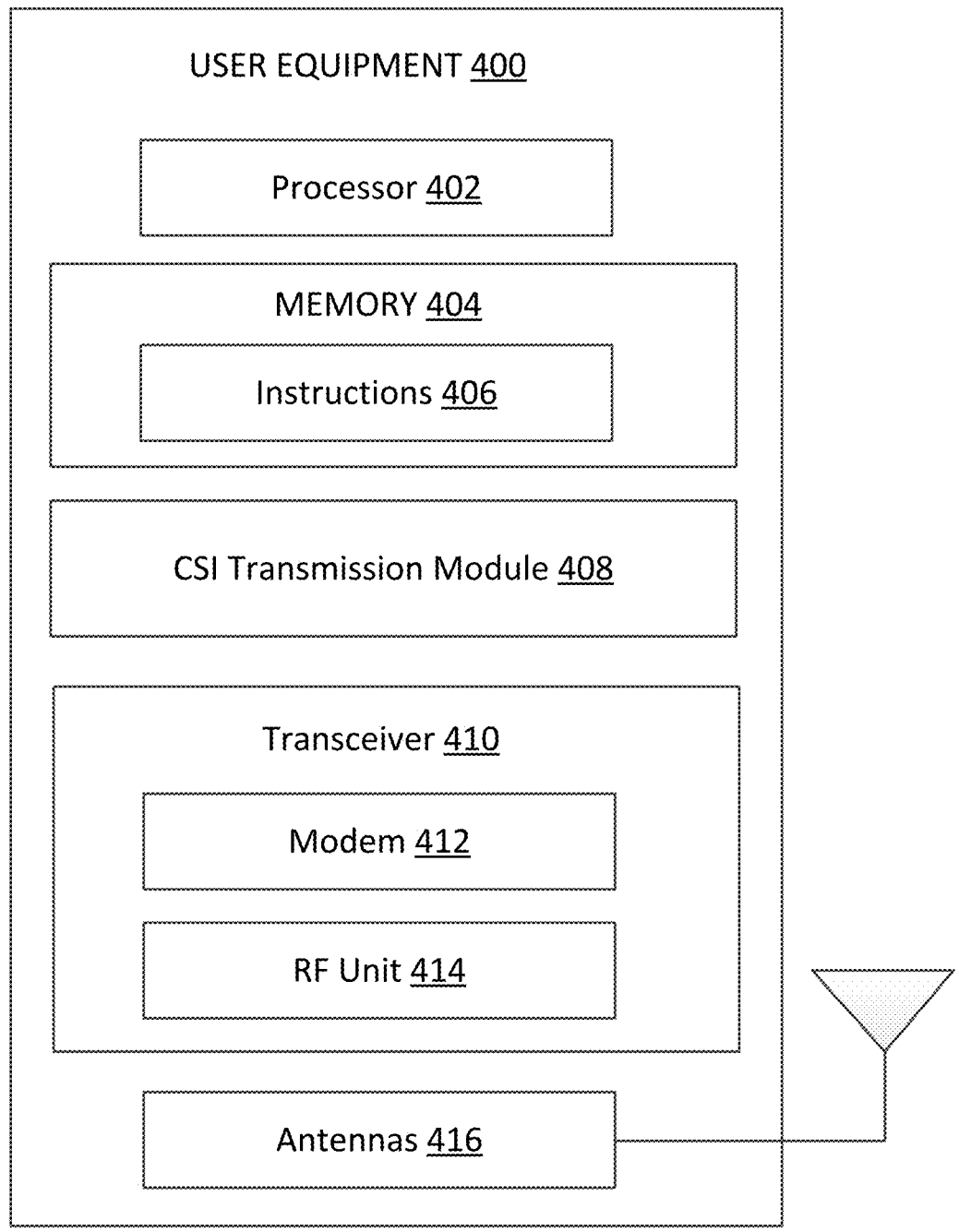
FIG. 4 is a block diagram of a user equipment (UE) according to some aspects of the present disclosure.

FIG. 4 is a block diagram of a UE 400 according to some aspects of the present disclosure. The UE 400 may be a UE 115 discussed above in FIG. 1. As shown, the UE 400 may include a processor 402, a memory 404, a CSI transmission module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UE 115 in connection with aspects of the present disclosure, for example, aspects of FIGS. 1-3 and 6-12. Instructions 406 may also be referred to as program code. The program code may be for causing a wireless communication device to perform these operations, for example, by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The CSI transmission module 408 may be implemented via hardware, software, or combinations thereof. The CSI transmission module 408 may be implemented as a processor, circuit, and/or instructions 406 stored in the memory 404 and executed by the processor 402. In some instances, the CSI transmission module 408 can be integrated within the modem subsystem 412. The CSI transmission module 408 can be implemented by a combination of software components (e.g., executed by a DSP or a general processor) and hardware components (e.g., logic gates and circuitry) within the modem subsystem 412. The CSI transmission module 408 may be used for various aspects of the present disclosure, for example, aspects of FIGS. 1-3 and 6-12.

In some aspects, the CSI transmission module 408 may be configured to perform one or more measurements of one or more reference signals configured for the UE. The CSI transmission module 408 may be configured to trigger transmission of a CSI report during a DRX cycle. The CSI transmission module 408 may be configured to transmit to a BS, the CSI report based on the triggering. The CSI report may include the one or more measurements.

In some aspects, the CSI transmission module 408 may be configured to determine during a DRX inactive time, to transmit a CSI report. The CSI transmission module 408 may be configured to transmit to a BS, the CSI report based on the determination to transmit the CSI report.

As shown, the transceiver 410 may include the modem subsystem 412 and the RF unit 414. The transceiver 410 can be configured to communicate bi-directionally with other devices, such as the BSs 105 or BS 500. The modem subsystem 412 may be configured to modulate and/or encode the data from the memory 404 and/or the CSI transmission module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105, 500. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., reference signals, reference signal measurements, CSI reports, WUS, etc.) to the CSI transmission module 409 for processing. The antennas 416 may include multiple antennas of similar or different designs in order to sustain multiple transmission links. The RF unit 414 may configure the antennas 416. The antenna(s) 416 may correspond to the antenna element(s) or port(s) discussed in the present disclosure.

In some aspects, the transceiver 410 may coordinate with the CSI transmission module 408 to receive reference signals, a WUS, and/or a command to reconfigure the UE's serving beam or candidate beam from the BS. The transceiver 410 may coordinate with the CSI transmission module 408 to transmit the CSI report to the BS. In some aspects, the UE 400 can include multiple transceivers 410 implementing different radio access technologies (RATs) (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
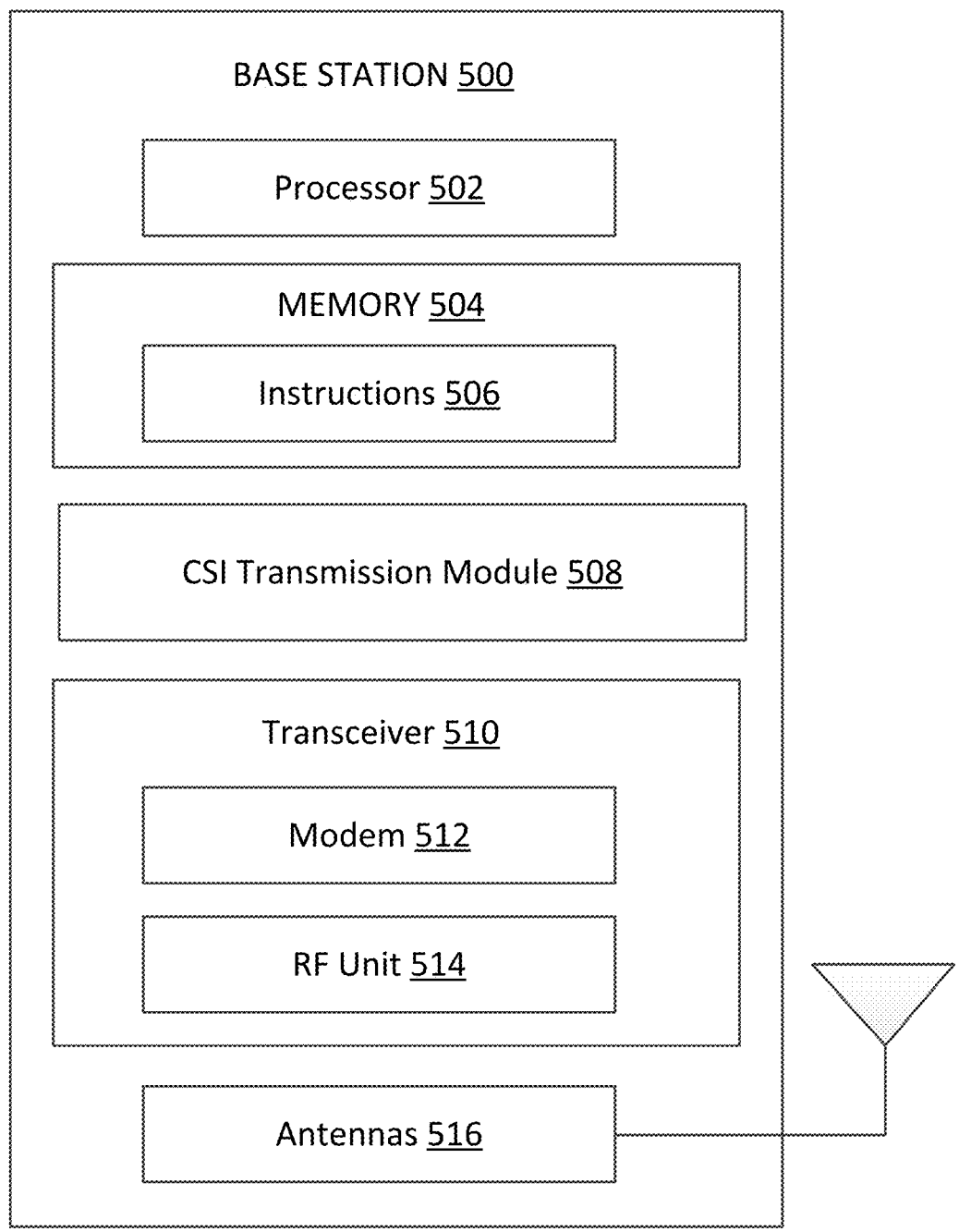
FIG. 5 is a block diagram of a base station (BS) according to some aspects of the present disclosure.

FIG. 5 is a block diagram of a BS 500 according to some aspects of the present disclosure. The BS 500 may be a BS 105 as discussed above in FIG. 1. As shown, the BS 500 may include a processor 502, a memory 504, a CSI transmission module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-3, 6-10, and 13. Instructions 506 may also be referred to as code, which may be interpreted broadly to include any type of computer-readable statement(s) as discussed above with respect to FIG. 4.

The CSI transmission module 508 may be implemented via hardware, software, or combinations thereof. The CSI transmission module 508 may be implemented as a processor, circuit, and/or instructions 506 stored in the memory 504 and executed by the processor 502. In some instances, the CSI transmission module 508 can be integrated within the modem subsystem 512. The CSI transmission module 508 can be implemented by a combination of software components (e.g., executed by a DSP or a general processor) and hardware components (e.g., logic gates and circuitry) within the modem subsystem 512. The CSI transmission module 508 may be used for various aspects of the present disclosure, for example, aspects of FIGS. 1-3, 6-10, and 13.

In some aspects, the CSI transmission module 508 may be configured to configure one or more DRX cycles for a UE. The CSI transmission module 508 may also be configured to receive from the UE, a CSI report from the UE when the BS has no DL data scheduled for the UE during a next occurrence of a DRX cycle.

As shown, the transceiver 510 may include the modem subsystem 512 and the RF unit 514. The transceiver 510 can be configured to communicate bi-directionally with other devices, such as the UEs 115 and/or 400, a BS, and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., grants, resource allocations) from the modem subsystem 512 (on outbound transmissions) or of transmissions originating from another source such as a UE 115 or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115, or 400 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., reference signals, reference signal measurements, CSI reports, WUS, etc.) to the CSI transmission module 508 for processing. The antennas 516 may include multiple antennas of similar or different designs in order to sustain multiple transmission links.

In some aspects, the transceiver 510 may coordinate with the CSI transmission module 508 to transmit reference signals, a WUS, and/or a command to reconfigure the UE's serving beam or candidate beam to the UE. The transceiver 410 may coordinate with the CSI transmission module 408 to receive the CSI report from the BS. In some aspects, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
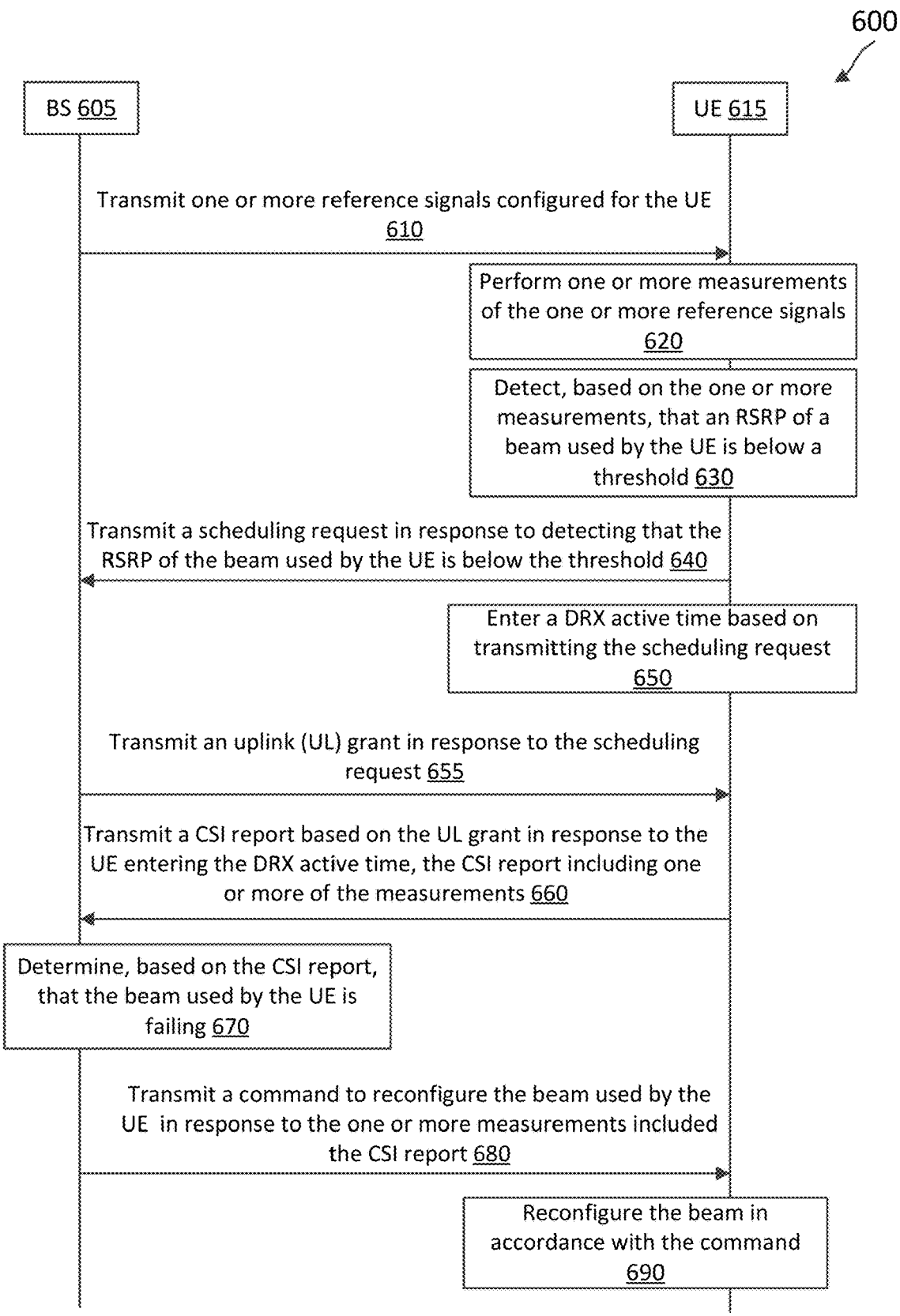
FIG. 6 is a signaling diagram of a wireless communication method according to some aspects of the present disclosure.
Figure 7:
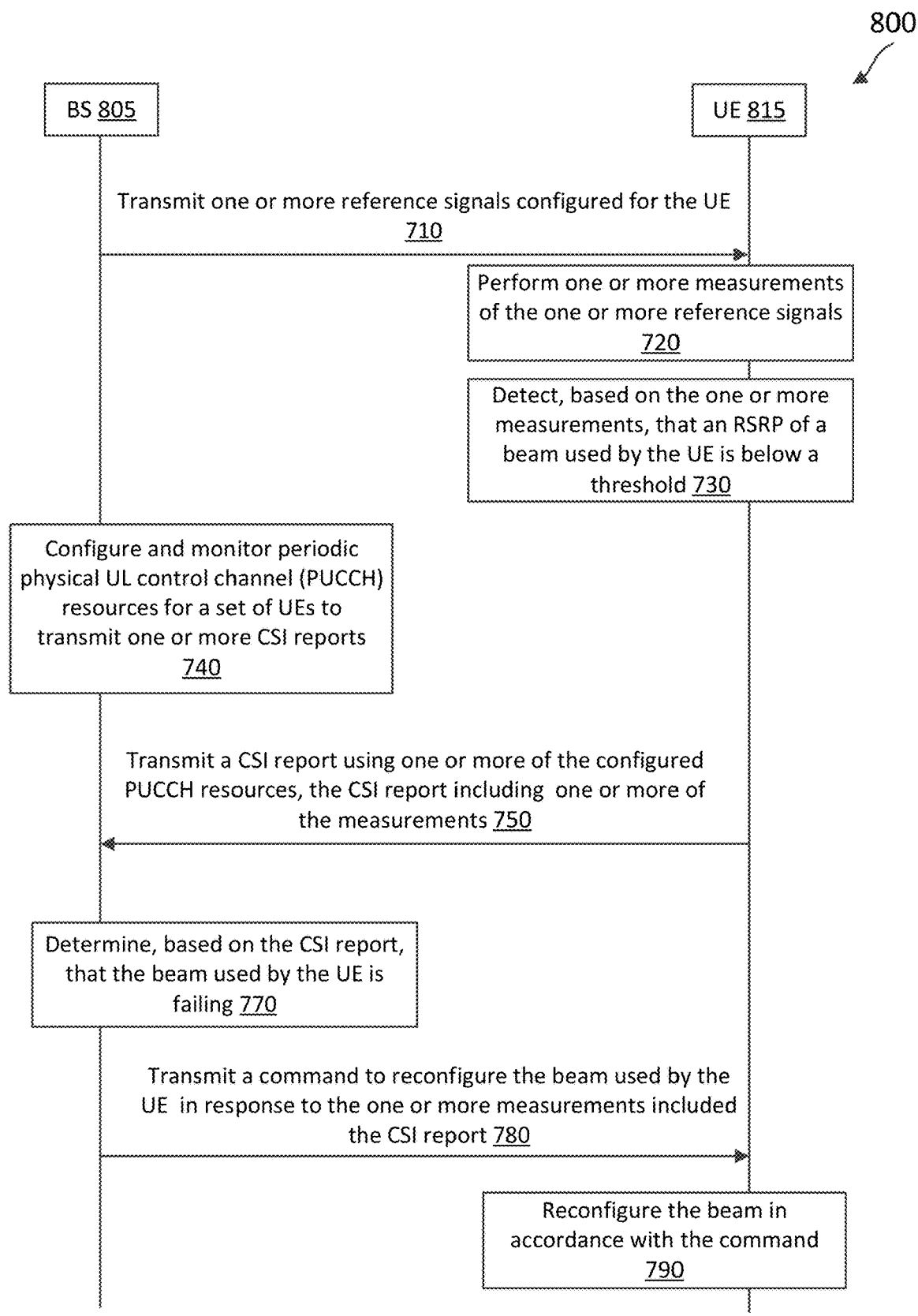
FIG. 7 is a signaling diagram of a wireless communication method according to some aspects of the present disclosure.

FIGS. 6 and 7 are signaling diagrams in which the UE may, during a DRX cycle, autonomously trigger transmission of a CSI report based on detecting that the RSRP of the beam used by the UE is below a threshold. In some aspects, the UE may perform one or more measurements of one or more reference signals configured for the UE and triggering transmission of a CSI report during a DRX cycle. The UE may transmit to the BS, the CSI report based on the triggering, the CSI report including the one or more measurements. The UE may transmit the CSI report based on the trigger event, which may cause the BS to receive the CSI report and reconfigure, based on the CSI report, the UE's beam(s). In FIG. 6, the UE may transmit to the BS, a scheduling request based on detecting that the RSRP of the beam used by the UE is below the threshold. In FIG. 7, the UE may transmit to the BS, the CSI report over one or more configured physical UL control channel (PUCCH) resources based on detecting that the RSRP of the beam used by the UE is below a threshold. The UE may perform the actions specified in the method 600 or the method 700 to trigger a CSI report when the UE detects a radio link quality has worsened and desires a beam reconfiguration.

FIG. 6 is a signaling diagram of a wireless communication method 600 according to some aspects of the present disclosure. The method 600 may be implemented between a BS 605 and a UE 615. The BS 605 may be similar to the BS 105, 500 and the UE 615 may be similar to the UE 115, 400. Additionally, the BS 605 and the UE 615 may operate in a network such as the network 100. As illustrated, the method 600 includes a number of enumerated actions, but embodiments of the method 600 may include additional actions before, after, and in between the enumerated actions. In some aspects, one or more of the enumerated actions may be omitted or performed in a different order.

At action 610, the BS 605 transmits one or more reference signals configured for the UE 615. The UE may receive the reference signals from the BS. At action 620, the UE may perform one or more measurements of the one or more reference signals. The UE may, for example, measure RSRP and/or CQI of one or more serving beams and/or one or more candidate beams. The one or more reference signals may be in a quasi co-located relationship with the one or more serving beams and/or one or more candidate beams used by the UE. The UE may determine when to wake up and perform the measurements. The UE may execute the action 620 during different DRX cycles. In some aspects, the UE may predict based on a history of the UE's mobility and/or based on a sensor detection that the UE has changed its reception angles of the phone. The UE may determine, based on the prediction and/or the sensor detection, to execute the action 602. In some aspects, the UE may execute the action 620 every N DRX cycles, where N is a number greater than 1. If the measurements performed at action 620 result in determining a good quality signal, the UE may enter the DRX inactive time. The UE may periodically wake up to execute the action 602.

At action 630, the UE may detect, based on the one or more measurements, that an RSRP of a beam used by the UE is below a threshold. The BS 605 may configure the threshold on UE 615's RSRP. For example, the BS may transmit the threshold via a RRC message to the UE. When the UE detects the signal strength of one or more serving beams and/or one or more candidate beams dropping below the threshold, the UE may execute at least some actions to trigger transmission of a CSI report. In an example, the UE may detect that either one beam used by the UE, all of the beams used by the UE, or an average of all beams used by the UE has dropped below the threshold.

At action 640, the UE may transmit a scheduling request. The UE may transmit the scheduling request in response to detecting that the RSRP of the beam used by the UE is below the threshold.

At action 650, the UE may enter a DRX active time based on transmitting the scheduling request. The UE may enter the DRX active time in response to transmitting the scheduling request. In some aspects, the UE may receive a WUS indicating that the UE is not scheduled for reception of DL data in a next occurrence of a DRX on-duration. The UE may determine during the DRX cycle to not enter the DRX active time during the DRX cycle in response to receiving the WUS. In other words, the UE may remain in a DRX inactive time during the DRX cycle in response to receiving the WUS. If the UE detects that an RSRP of a beam used by the UE is below the threshold, the UE may determine to enter the DRX active time, despite the WUS indicating that the UE is not scheduled for reception of DL data in a next occurrence of a DRX on-duration.

At action 655, the BS may transmit an UL grant to the UE in response to the scheduling request. The UE may receive the UL grant. At action 660, the UE may transmit a CSI report in response to the UE entering the DRX active time. The UE may transmit the CSI report based on the UL grant. Additionally, the CSI report may include one or more of the measurements. For example, the CSI report may include at least one of RSRP or CQI. The UE may transmit the CSI report during a DRX on-duration of the DRX cycle. In some aspects, the CSI report is multiplexed between at least one of RSRP or CQI or other UL control information (UCI) when configured PUCCH resources of the RSRP, or CQI, or the other UCI overlap.

At action 670, the BS determines, based on the CSI report, that the beam used by the UE is failing. The BS receives the CSI report from the UE and analyzes the CSI report. The BS may determine that the beam is failing because its RSRP has fallen below the threshold. At action 680, the BS may transmit a command to reconfigure the beam used by the UE in response to the one or more measurements included in the CSI report. The UE receives the command. At action 690, the UE reconfigures the beam in accordance with the command.

It should be understood that the actions discussed in FIG. 6 may apply to a plurality of beams. For example, although action 630 may include detecting, based on the one or more measurements, that the RSRPs of a plurality of beams are below a threshold, action 670 may include determining, based on the CSI report, that the plurality of beams used by the UE is failing, action 680 may include transmitting a command to reconfigure the plurality of beams, and action 690 may include reconfiguring the plurality of beams in accordance with the command.

If the BS 605 and the UE 615 communicate via the communication method 600, the BS may transmit an indication of a UL grant to the UE in response to the UE's scheduling request (see action 655). The UL grant, however, may be a wasted resource because the UE does not have UL data to send. The UE transmitted the scheduling request based on detecting that the RSRP of the beam used by the UE is below a threshold, not based on having a UL data to transmit. Additionally, the BS 605 may configure the scheduling resource close to PUCCH resources for CSI, which may restrict the BS's scheduling flexibility. FIG. 7 below provides a solution to the wasted UL grant along improving the BS's scheduling flexibility. In FIG. 7, the BS does not transmit a UL grant that is thereafter not used by the UE.

FIG. 7 is a signaling diagram of a wireless communication method 700 according to some aspects of the present disclosure. The method 700 may be implemented between a BS 705 and a UE 715. The BS 705 may be similar to the BS 105, 500, 605 and the UE 715 may be similar to the UE 115, 400, 615. Additionally, the BS 705 and the UE 715 may operate in a network such as the network 100. As illustrated, the method 700 includes a number of enumerated actions, but embodiments of the method 700 may include additional actions before, after, and in between the enumerated actions. In some aspects, one or more of the enumerated actions may be omitted or performed in a different order.

The method 700 includes actions 710, 720, and 730. The actions in the method 700 (e.g., actions 710, 720, and 730) are similar to actions in the method 600 (e.g., actions 610, 620, and 630).

At action 740, the BS configures and monitors periodic PUCCH resources for a set of UEs to transmit one or more CSI reports. The set of UEs may include only one UE (e.g., UE 715) or may include a plurality of UEs. The BS may monitor all PUCCH resources configured for CSI reporting. Even if the BS knows that the UE will not be in the DRX active time, the UE may continue to monitor the configured PUCCH for CSI reports, in case the UE autonomously transmits a CSI report.

At action 750, the UE 715 transmits a CSI report using one or more of the configured PUCCH resources, the CSI report including one or more of the measurements from action 720. The UE 715 may transmit the CSI report during a DRX on-duration if the CSI-masking is configured. The UE 715 may transmit the CSI report while the UE is not in the DRX active time (e.g., in a wake state), when the UE wants to request a beam reconfiguration, regardless of whether the UE received a WUS indicating that the UE has no DL data to receive in a next occurrence of a DRX cycle. In some aspects, the CSI report is multiplexed between at least one of RSRP or CQI or other UCI when configured PUCCH resources of the RSRP, or CQI, or the other UCI overlap.

The method 700 includes actions 770, 780, and 790. The actions in the method 700 (e.g., actions 770, 780, and 790) are similar to actions in the method 600 (e.g., actions 670, 680, and 690). It should be understood that the actions discussed in FIG. 7 may apply to a plurality of beams.

In the method 700, the UE 715 does not transmit a scheduling request to the BS 705. Accordingly, no UL grant is wasted. In the method 700, the BS monitors all PUCCH resources configured for CSI reporting. For example, the BS may transmit a WUS indicating that the UE is not scheduled for reception of DL data during the next occurrence of a DRX cycle, but will still monitor the configured PUCCH resources for CSI reporting.

Figure 8:
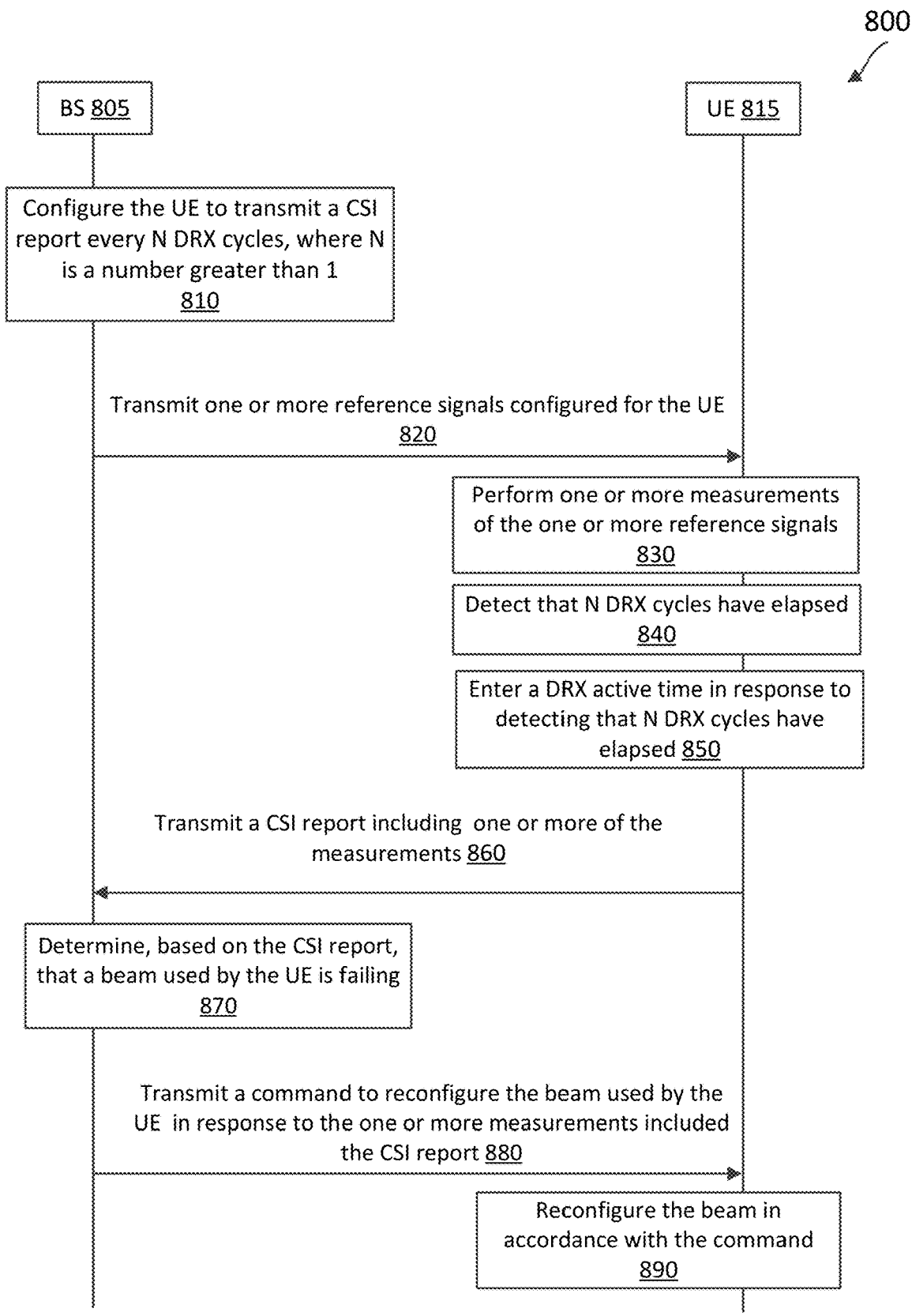
FIG. 8 is a signaling diagram of a wireless communication method according to some aspects of the present disclosure.
Figure 9:
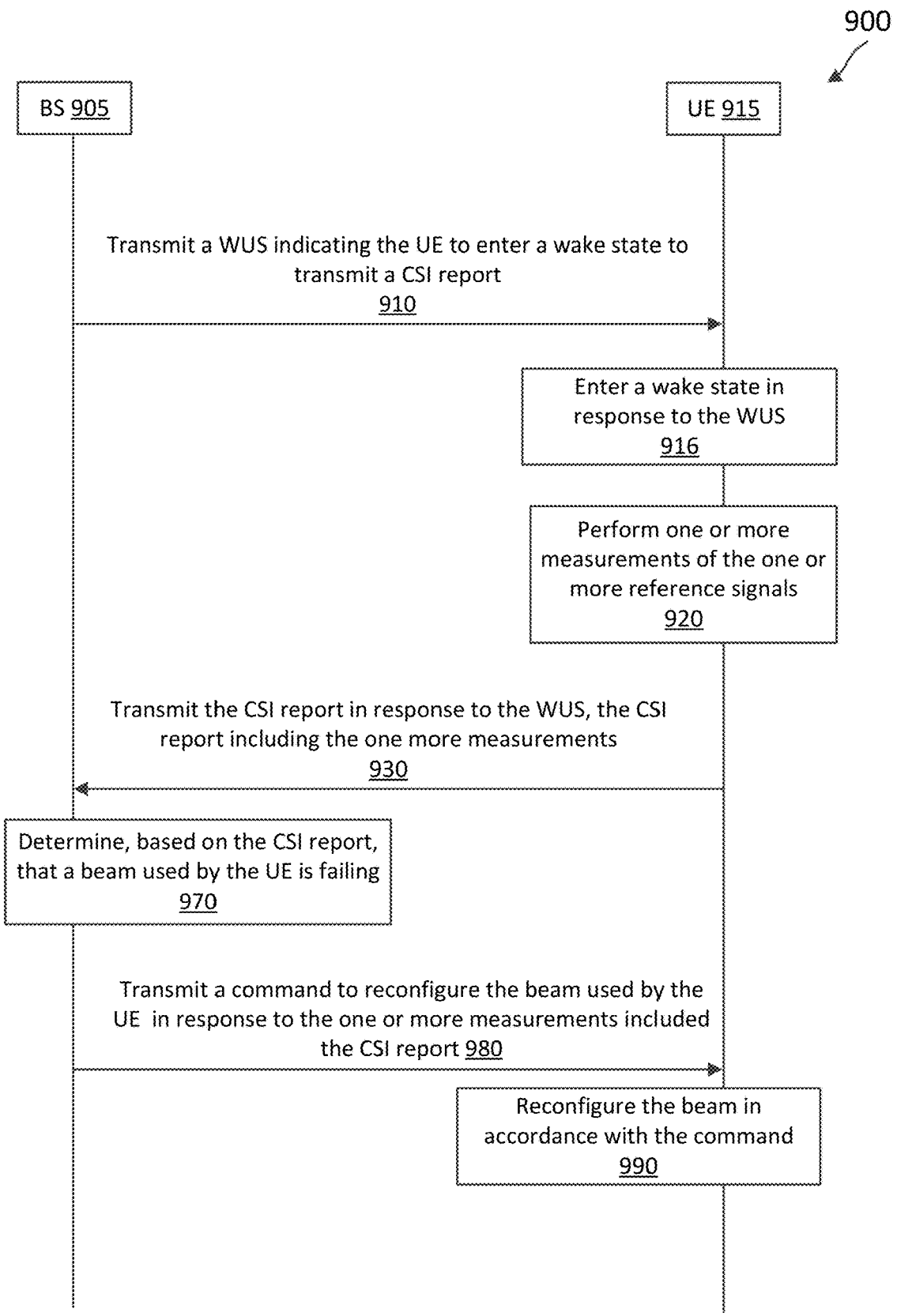
FIG. 9 is a signaling diagram of a wireless communication method according to some aspects of the present disclosure.
Figure 10:
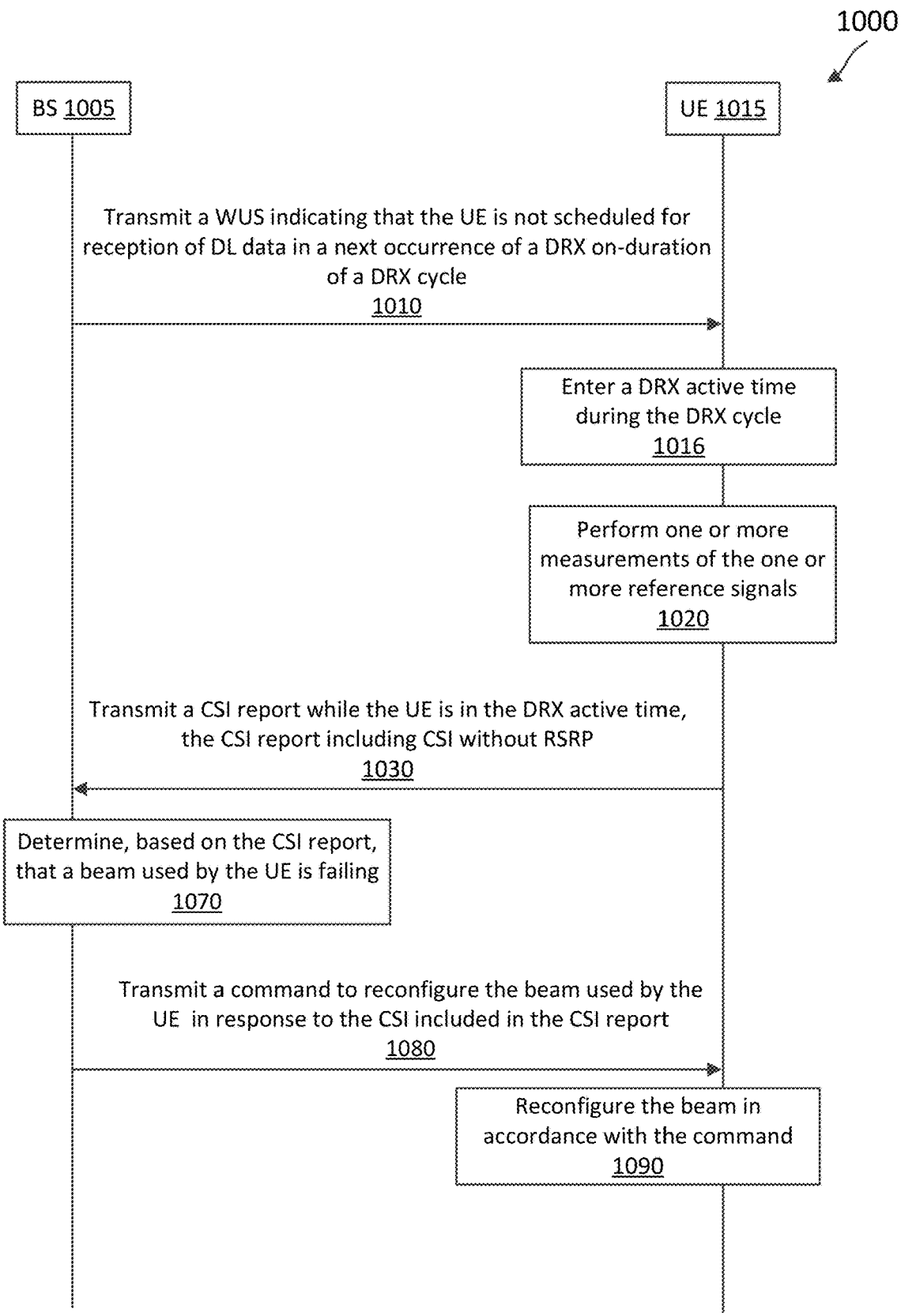
FIG. 10 is a signaling diagram of a wireless communication method according to some aspects of the present disclosure.

FIGS. 8-10 are signaling diagrams in which the UE may determine, during a DRX inactive time, to transmit a CSI report. In FIGS. 8-10, the UE may determine, during a DRX inactive time, to transmit a CSI report. The UE may accordingly transmit to a BS, the CSI report based on the determination to transmit the CSI report.

FIG. 8 is a signaling diagram of a wireless communication method 800 according to some aspects of the present disclosure. The method 800 may be implemented between a BS 805 and a UE 815. The BS 805 may be similar to the BS 105, 500 and the UE 815 may be similar to the UE 115, 400. Additionally, the BS 805 and the UE 815 may operate in a network such as the network 100. As illustrated, the method 800 includes a number of enumerated actions, but embodiments of the method 800 may include additional actions before, after, and in between the enumerated actions. In some aspects, one or more of the enumerated actions may be omitted or performed in a different order.

At action 810, the BS 805 configures the UE 815 to transmit a CSI report every N DRX cycles, where N is a number greater than 1. At action 820, the BS transmits one or more reference signals configured for the UE 815. The UE may receive the reference signals from the BS.

At action 830, the UE may perform one or more measurements of the one or more reference signals. The UE may, for example, measure RSRP and/or CQI of one or more serving beams and/or one or more candidate beams. The one or more reference signals may be in a quasi co-located relationship with the one or more serving beams and/or one or more candidate beams used by the UE.

At action 840, the UE detects that N DRX cycles have elapsed. The UE may transmit the CSI report every N cycles rather than every DRX cycle. At action 850, the UE enters a DRX active time in response to detecting that N DRX cycles have elapsed. At action 860, the UE transmits a CSI report including one or more of the measurements from action 830. The CSI report may include at least one of RSRP or CQI. The UE may transmit the CSI report in response to the UE entering the DRX active time or in response to detecting that N DRX cycles have elapsed. The BS receives the CSI report from the UE and analyzes the CSI report.

The method 800 includes actions 870, 880, and 890. The actions in the method 800 (e.g., actions 870, 880, and 890) are similar to actions in the method 600 (e.g., actions 670, 680, and 690). It should be understood that the actions discussed in FIG. 8 may apply to a plurality of beams.

FIG. 9 is a signaling diagram of a wireless communication method 900 according to some aspects of the present disclosure. The method 900 may be implemented between a BS 905 and a UE 915. The BS 905 may be similar to the BS 105, 500 and the UE 915 may be similar to the UE 115, 400. Additionally, the BS 905 and the UE 915 may operate in a network such as the network 100. As illustrated, the method 900 includes a number of enumerated actions, but embodiments of the method 900 may include additional actions before, after, and in between the enumerated actions. In some aspects, one or more of the enumerated actions may be omitted or performed in a different order.

At action 910, the BS 905 may transmit a WUS indicating the UE to enter a wake state to transmit a CSI report. For example, the WUS may include the indication 302 in FIG. 3, where the indication 302 indicates to the UE to enter the wake state to transmit the CSI report. At action 916, the UE may enter the wake state in response to the WUS. At action 920, the UE may perform one or more measurements of the one or more reference signals. The UE may, for example, measure RSRP and/or CQI of one or more serving beams and/or one or more candidate beams. The one or more reference signals may be in a quasi co-located relationship with the one or more serving beams and/or one or more candidate beams used by the UE. In some examples, the WUS may include the indication 304 in FIG. 4, where the indication 302 indicates that the UE is not scheduled for reception of DL data during the next occurrence of a DRX cycle. Even if the WUS indicates that the UE has no DL data to receive in the next occurrence of a DRX cycle, the UE may still transmit the CSI report based on the WUS indicating that the UE enter a wake state to transmit the CSI report. At action 930, the UE may transmit the CSI report in response to the WUS, the CSI report including the one or more measurements.

In some aspects, the UE remains in the wake state for an entire duration of the DRX on-duration. In some aspects, the WUS indicates that the UE is not scheduled for reception of DL data during the next occurrence of a DRX cycle, but that the UE should wake up to report the CSI. Accordingly, it may be unnecessary for the UE to remain in the wake up state for the full duration of the DRX on-duration. Instead, the UE may wake up to measure CSI-RS, transmit the CSI report, and then enter the DRX inactive time.

The method 900 includes actions 970, 980, and 990. The actions in the method 900 (e.g., actions 970, 980, and 990) are similar to actions in the method 600 (e.g., actions 670, 680, and 690). It should be understood that the actions discussed in FIG. 9 may apply to a plurality of beams.

FIG. 10 is a signaling diagram of a wireless communication method 1000 according to some aspects of the present disclosure. The method 1000 may be implemented between a BS 1005 and a UE 1015. The BS 1005 may be similar to the BS 105, 500 and the UE 1015 may be similar to the UE 115, 400. Additionally, the BS 1005 and the UE 1015 may operate in a network such as the network 100. As illustrated, the method 1000 includes a number of enumerated actions, but embodiments of the method 1000 may include additional actions before, after, and in between the enumerated actions. In some aspects, one or more of the enumerated actions may be omitted or performed in a different order.

At action 1010, the BS 1005 transmits a WUS indicating that the UE is not scheduled for reception of DL data in a next occurrence of a DRX on-duration of a DRX cycle.

At action 1016, the UE 1015 may enter a DRX active time during the DRX cycle. At action 1020, the UE may perform one or more measurements of the one or more reference signals. At action 1030, the UE 1015 transmits a CSI report while the UE is in the DRX active time, the CSI report including CSI without RSRP.

In some aspects, the BS may transmit the CSI reporting configuration to the UE. The CSI reporting configuration may be preconfigured. The CSI reporting configuration may indicate that CSI with RSRP is not configured with a threshold. The UE may receive the CSI reporting configuration and determine, during a next DRX inactive time, whether to transmit or not transmit CSI to the BS. The UE may determine, during a next DRX inactive time, to not transmit a second CSI report to the BS based on the CSI reporting configuration indicating that CSI with RSRP is not configured with a threshold.

Figure 11:
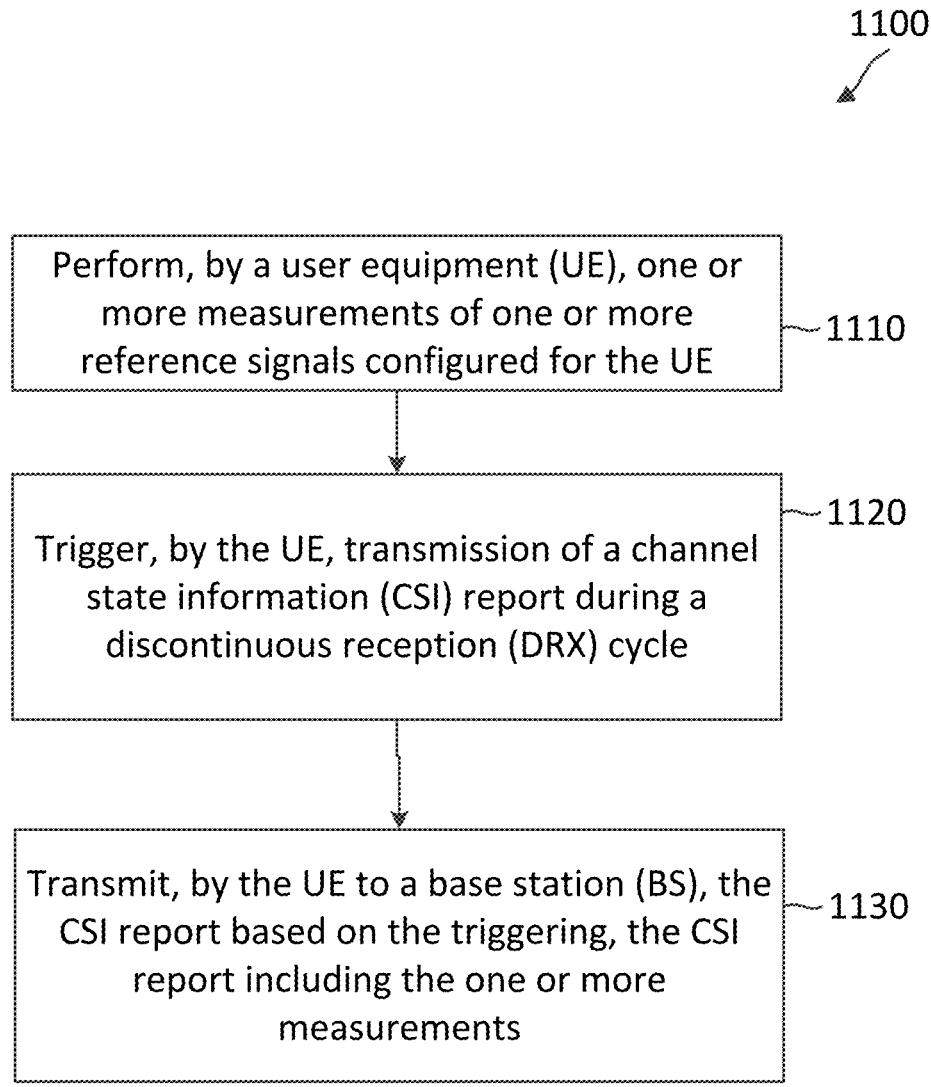
FIG. 11 illustrates a flow diagram of a wireless communication method according to some aspects of the present disclosure.

FIG. 11 is a flow diagram of a communication method 1100 according to some aspects of the present disclosure. Aspects of the method 1100 can be executed by a wireless communication device, such as the UEs 115 and/or 400 utilizing one or more components, such as the processor 402, the memory 404, the CSI transmission module 408, the transceiver 410, the modem 412, the one or more antennas 416, and various combinations thereof. As illustrated, the method 1100 includes a number of enumerated steps, but the method 1100 may include additional steps before, after, and in between the enumerated steps. For example, in some instances one or more aspects of methods 600 and/or 700 may be implemented as part of method 1100. In some instances, one or more of the enumerated steps may be omitted or performed in a different order.

At step 1110, the method 1100 includes performing, by a user equipment (UE), one or more measurements of one or more reference signals configured for the UE. In some aspects, the UE may measure one or more RSRPs and/or CQIs. The one or more reference signals may be in a quasi co-located relationship with one or more serving beams and one or more candidate beams used by the UE. The UE may detect that a RSRP of one or more serving beams and/or one or more candidate beams of the UE is below a threshold.

At step 1120, the method 1100 includes triggering, by the UE, transmission of a CSI report during a DRX cycle. In some aspects, the UE may trigger the transmission of the CSI report in response to detecting that a RSRP of one or more serving beams and/or one or more candidate beams of the UE is below a threshold.

In some aspects, the UE may transmit to the BS, a scheduling request. After transmitting the scheduling request, the UE may enter the DRX active time. The transmission of the scheduling request may trigger the UE to transmit the CSI report because the UE may enter the DRX active time in response to transmitting the scheduling request. Additionally, the UE may transmit the CSI report in response to the UE entering the DRX active time. The CSI report may include at least one of RSRP or CQI. In some aspects, the UE may trigger transmission of the CSI report by detecting that the UE's radio link quality has dropped below a threshold configured by the BS or by detecting a failure in one or more serving beams of the UE.

At step 1130, the method 1100 includes transmitting, by the UE to a BS, the CSI report based on the triggering, the CSI report including the one or more measurements. In some aspects, the UE may transmit the CSI report over one or more configured PUCCH resources. In some aspects, the CSI report is multiplexed between at least one of RSRP or CQI or other UCI when configured PUCCH resources of the RSRP, or CQI, or the other UCI overlap.

In some aspects, the UE transmits the CSI report while the UE is in the DRX active time. In some aspects, the UE transmits the CSI report while the UE is not in a DRX active time (e.g., in the wake state) and/or during a DRX on-duration of the DRX cycle. In some aspects, the UE may receive from the BS, a WUS indicating that the UE is not scheduled for reception of DL data in a next occurrence of a DRX on-duration. The UE may determine, during the DRX cycle, to not enter the DRX active time during the DRX cycle in response to receiving the WUS. In other words, the UE may remain in a DRX inactive time during the DRX cycle in response to receiving the WUS.

Figure 12:
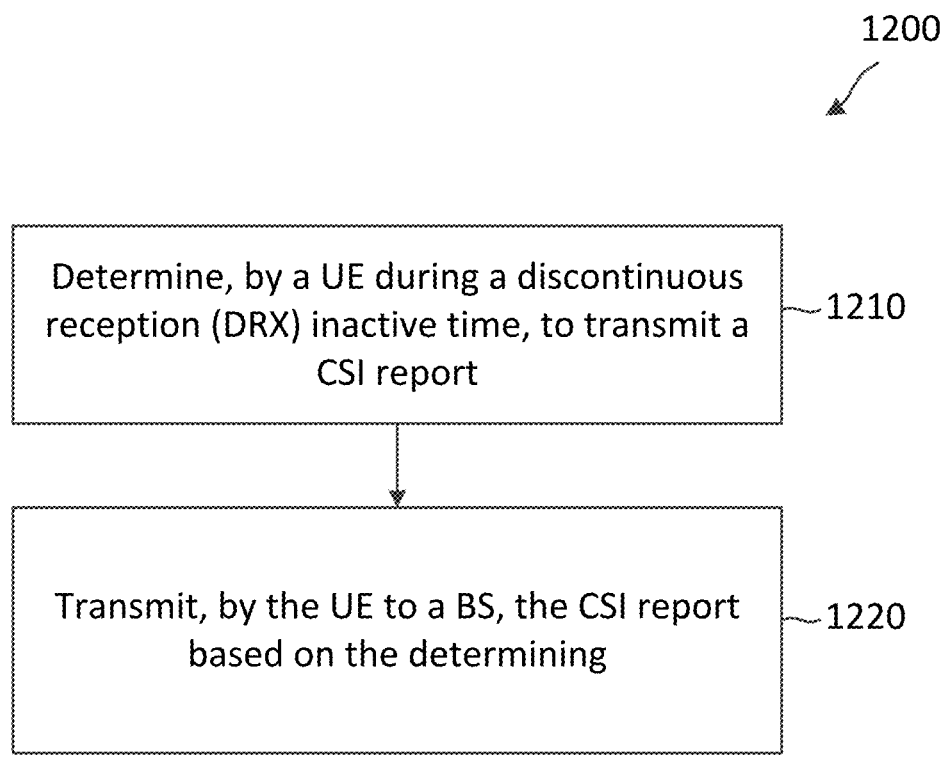
FIG. 12 illustrates a flow diagram of a wireless communication method according to some aspects of the present disclosure.

FIG. 12 is a flow diagram of a communication method 1200 according to some aspects of the present disclosure. Aspects of the method 1200 can be executed by a wireless communication device, such as the UEs 125 and/or 400 utilizing one or more components, such as the processor 402, the memory 404, the CSI transmission module 408, the transceiver 410, the modem 412, the one or more antennas 416, and various combinations thereof. As illustrated, the method 1200 includes a number of enumerated steps, but the method 1200 may include additional steps before, after, and in between the enumerated steps. For example, in some instances one or more aspects of methods 800, 900, and/or 1000 may be implemented as part of method 1200. In some instances, one or more of the enumerated steps may be omitted or performed in a different order.

At step 1210, the method 1200 includes determining, by a UE during a DRX inactive time, to transmit a CSI report. At step 1220, the method 1200 includes transmitting, by the UE to a BS, the CSI report based on the determining. In some aspects, the CSI report is multiplexed between at least one of RSRP or CQI or other UCI when configured PUCCH resources of the RSRP, or CQI, or the other UCI overlap.

In some aspects, the UE detects that a given number of DRX cycles has elapsed. The UE may enter a DRX active time to transmit the CSI report in response to detecting that the given number of DRX cycles has elapsed. The UE may determine to transmit the CSI report in response to detecting that the given number of DRX cycles has elapsed. The given number of DRX cycles may be configured by the BS.

In some aspects, the UE receives from the BS, a WUS indicating the UE to enter a wake state to transmit the CSI report. The UE may determine to transmit the CSI report in response to receiving the WUS indicating the UE to enter the wake state to transmit the CSI report. Additionally, the WUS may indicate that the UE is not scheduled for reception of DL data in a next occurrence of a DRX on-duration, and the UE may transmit the CSI report while the UE is in the wake state. The UE may enter during a DRX on-duration of a DRX cycle, the wake state based on the WUS. In an example, the UE may remain in the wake state during the entire and/or remaining DRX on-duration. In another example, the UE may enter the DRX inactive time after transmitting the CSI report in response to receiving the WUS indicating that the UE is not scheduled for reception of DL data in the next occurrence of the DRX on-duration. In this example, the UE may be in the DRX inactive time during at least part of the DRX on-duration.

Figure 13:
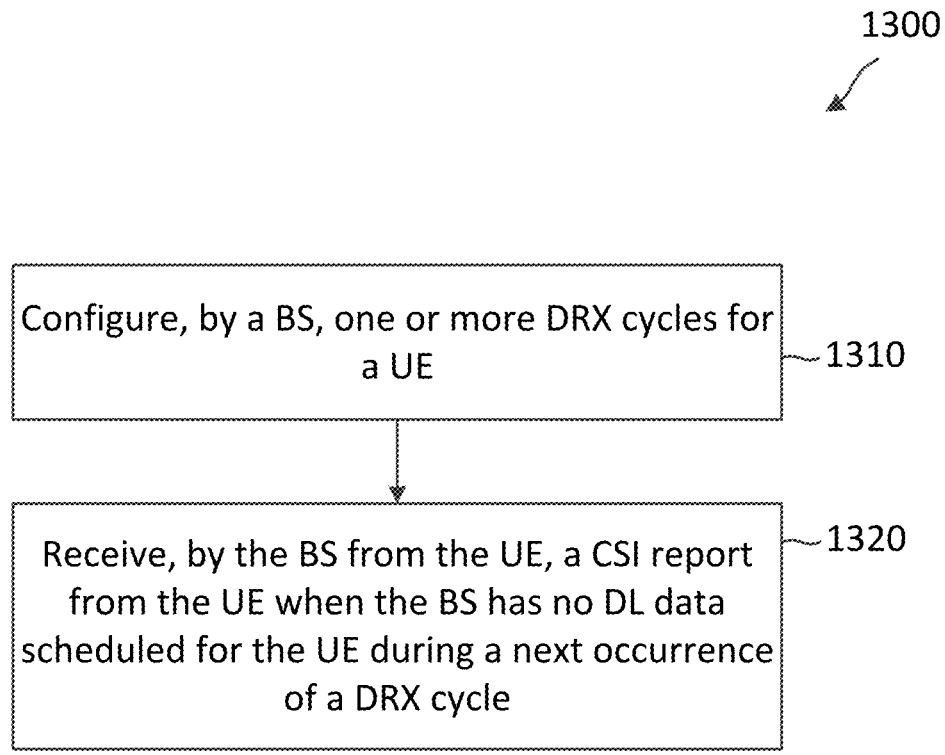
FIG. 13 illustrates a flow diagram of a wireless communication method according to some aspects of the present disclosure.

FIG. 13 is a flow diagram of a communication method 1300 according to some aspects of the present disclosure. Aspects of the method 1300 can be executed by a wireless communication device, such as the BSs 105 and/or 500 utilizing one or more components, such as the processor 502, the memory 504, the CSI transmission module 508, the transceiver 510, the modem 512, the one or more antennas 516, and various combinations thereof. As illustrated, the method 1300 includes a number of enumerated steps, but the method 1300 may include additional steps before, after, and in between the enumerated steps. For example, in some instances one or more aspects of methods 600, 700, 800, 900, and/or 1000 may be implemented as part of method 1300. In some instances, one or more of the enumerated steps may be omitted or performed in a different order.

At step 1310, the method 1300 includes configuring, by a BS, one or more DRX cycles for a user equipment UE. At step 1320, the method 1300 includes receiving, by the BS from the UE, a CSI report from the UE when the BS has no DL data scheduled for the UE during a next occurrence of a DRX cycle.

In some aspects, the BS transmits one or more reference signals configured for the UE, and receives a CSI report based on the one or more measurements associated with the one or more reference signals. The BS may receive the CSI report while the UE is not in a DRX active time. Additionally, the BS may receive the CSI report during a DRX on-duration of the DRX cycle.

In some aspects, the BS transmits to the UE, a WUS indicating that the UE is not scheduled for reception of DL data in a next occurrence of a DRX on-duration. In some aspects, the BS may receive a scheduling request from the UE and transmit an UL grant in response to receiving the scheduling request. The BS may receive the CSI report based on the UL grant and while the UE is in the DRX active time. In some aspects, the BS may configure PUCCH resources for CSI reports and monitor the configured PUCCH resources. The BS may receive the CSI report over one or more of the configured PUCCH resources. In some aspects, the BS may detect, based on the CSI report, that the UE's radio link quality has dropped below a threshold and may transmit a command to reconfigure the UE's serving beam(s) and/or candidate beam(s) in response to the detecting. The BS may configure the threshold.

In some aspects, the BS may configure the UE to transmit a CSI report after a given number of DRX cycles has elapsed, where the BS receives the CSI report after the given number of DRX cycles has elapsed. In some aspects, the BS may transmit a WUS to the UE indicating the UE to enter a wake state to transmit the CSI report, and the BS may receive the CSI report in response to transmitting the WUS. The WUS may also indicate that the UE is not scheduled for reception of DL data in a next occurrence of a DRX on-duration. In some aspects, the BS may transmit to the UE, a WUS indicating that the UE is not scheduled for reception of DL data in a next occurrence of a DRX on-duration of a DRX cycle. The BS may receive the CSI report while the UE is in the DRX active time, and the CSI report may include CSI without RSRP.

In some aspects, an apparatus, comprises: a processor configured to: perform, by a user equipment (UE), one or more measurements of one or more reference signals configured for the UE; and trigger, by the UE, transmission of a channel state information (CSI) report during a discontinuous reception (DRX) cycle; and a transceiver configured to: transmit, by the UE to a base station (BS), the CSI report based on the triggering, the CSI report including the one or more measurements.

In some instances, the transceiver is configured to transmit the CSI report while the UE is not in a DRX active time and during a predefined interval for DRX on-duration of the DRX cycle. In some instances, the transceiver is configured to receive, by the UE from the BS, a wake-up signal (WUS) indicating that the UE is not scheduled for reception of DL data during a DRX on-duration of the DRX cycle; and the processor is configured to remain, by the UE, in a DRX off-time during the DRX cycle in response to receiving the WUS.

In some instances, the processor is configured to: detect that the UE's radio link quality has dropped below a threshold configured by the BS; and trigger the transmission of the CSI report in response to a detection that the UE's radio link quality has dropped below the threshold.

In some instances, the processor is configured to measure at least one of a reference signal received power (RSRP) or a channel quality indicator (CQI).

In some instances, the transceiver is configured to: transmit a scheduling request that triggers transmission of the CSI report; and transmit the CSI report in response to the UE entering the DRX active time; and the processor is configured to enter a DRX active time in response to transmitting the scheduling request.

In some instances, the transceiver is configured to transmit the CSI report over one or more configured Physical Uplink Control Channel (PUCCH) resources.

In some instances, the processor is configured to: detect that the UE's radio link quality has dropped below a threshold configured by the BS; and trigger transmission of the CSI report in response to a detection that the UE's radio link quality has dropped below the threshold.

In some instances, the transceiver is configured to receive, by the UE from the BS, a command to reconfigure the UE's serving beam or candidate beam in response to the one or more measurements included the CSI report; and the processor is configured to reconfigure the UE's serving beam or candidate beam in accordance with the command.

In some aspects, an apparatus comprises: a processor configured to determine, by a user equipment (UE) during a discontinuous reception (DRX) inactive time, to transmit a CSI report; and a transceiver configured to transmit, by the UE to a base station (BS), the CSI report based on a determination during the DRX inactive time to transmit the CSI report.

In some instances, the processor is configured to: detect, by the UE, that a given number of DRX cycles has elapsed; enter, by the UE, a DRX active time to transmit the CSI report in response to a detection that the given number of DRX cycles has elapsed; and determine to transmit the CSI report in response to a detection that the given number of DRX cycles has elapsed. In some instances, the transceiver is configured to receive, by the UE from the BS, a wake-up signal (WUS) indicating the UE to enter a wake state to transmit the CSI report; and the processor is configured to determine during the DRX inactive time to transmit the CSI report in response to receiving the WUS indicating the UE to enter the wake state to transmit the CSI report. In some instances, the WUS indicates that the UE is not scheduled for reception of DL data in a next occurrence of a DRX on-duration. In some instances, the processor is configured to enter, by the UE during a DRX on-duration of a DRX cycle, the wake state based on the WUS, wherein the UE remains in the wake state during the DRX on-duration; and the transceiver is configured to transmit CSI report while the UE is in the wake state. In some instances, the WUS indicates that the UE is not scheduled for reception of DL data in a next occurrence of a DRX on-duration of a DRX cycle, the processor is configured to enter, by the UE during the DRX on-duration, the wake state based on the WUS; and the transceiver is configured to transmit the CSI report while the UE is in the wake state.

In some instances, the processor is configured to perform, by the UE, one or more measurements of one or more reference signals configured for the UE, and the CSI report is based on the one or more measurements. In some instances, the transceiver is configured to receive, by the UE from the BS, a command to reconfigure the UE's serving beam or candidate beam in response to the one or more measurements included the CSI report; and the processor is configured to reconfigure the UE's serving beam or candidate beam in accordance with the command.

In some instances, the transceiver is configured to: receive, by the UE from the BS, a WUS indicating that the UE is not scheduled for reception of DL data in a next occurrence of a DRX on-duration of a DRX cycle; and transmit the CSI report while the UE is in a DRX active time, wherein the CSI report includes CSI without a reference signal received power (RSRP); and the processor is configured to enter, by the UE, the DRX active time during the DRX cycle.

In some instances, the transceiver is configured to receive a CSI reporting configuration indicating that CSI with RSRP is not configured with a threshold; and the processor is configured to determine, by the UE during a next DRX inactive time, to not transmit a second CSI report to the BS based on the CSI reporting configuration.

In some aspects, a non-transitory computer-readable medium having program code recorded thereon is provided, the program code comprising: code for causing a user equipment (UE) to perform one or more measurements of one or more reference signals configured for the UE; code for causing the UE to trigger transmission of a channel state information (CSI) report during a discontinuous reception (DRX) cycle; and code for causing the UE to transmit to a base station (BS), the CSI report based on the triggering, the CSI report including the one or more measurements.

In some instances, the code for causing the UE to transmit the CSI report includes code for causing the UE to transmit the CSI report while the UE is not in a DRX active time and during a DRX on-duration of the DRX cycle.

In some instances, the program code comprises: code for causing the UE to detect that a reference signal received power (RSRP) of one or more serving beams or one or more candidate beams of the UE is below a threshold, wherein detection of the RSRP of one or more serving beams or one or more candidate beams of the UE being below a threshold causes the trigger of the CSI report transmission.

In some instances, the program code comprises: code for causing the UE to transmit to the BS, a scheduling request; code for causing the UE to enter a DRX active time in response to transmitting the scheduling request, wherein the code for causing the UE to transmit the CSI report is executed if the code for causing the UE to enter the DRX active time is executed.

In some instances, the code for causing the UE to transmit the CSI report includes code for causing the UE to transmit the CSI report over one or more configured Physical Uplink Control Channel (PUCCH) resources.

In some aspects, a non-transitory computer-readable medium having program code recorded thereon is provided, the program code comprising: code for causing a user equipment (UE) determine during a discontinuous reception (DRX) inactive time, to transmit a CSI report; and code for causing the UE to transmit to a base station (BS), the CSI report based on the determining.

In some instances, the program code comprises: code for causing the UE to detect that a given number of DRX cycles has elapsed; and code for causing the UE to enter a DRX active time to transmit the CSI report in response to a detection that the given number of DRX cycles has elapsed, wherein the code for causing the UE to determine to transmit the CSI report is executed in response to a detection that the given number of DRX cycles has elapsed.

In some instances, the program code comprises: code for causing the UE to receive from the BS, a wake-up signal (WUS) indicating the UE to enter a wake state to transmit the CSI report, wherein the WUS indicates that the UE is not scheduled for reception of DL data in a next occurrence of a DRX on-duration.

In some instances, the program code comprises: code for causing the UE to receive from the BS, a WUS indicating that the UE is not scheduled for reception of DL data in a next occurrence of a DRX on-duration of a DRX cycle; and code for causing the UE to enter a DRX active time during the DRX cycle, wherein the code for causing the UE to transmit the CSI report includes code for causing the UE to transmit the CSI report while the UE is in the DRX active time, and wherein the CSI report includes CSI without RSRP.

In some instances, the program code comprises: code for causing the UE to receive a CSI reporting configuration indicating that CSI with RSRP is not configured with a threshold; and code for causing the UE to determine, by the UE during a next DRX inactive time, to not transmit a second CSI report to the BS based on the CSI reporting configuration.

In some aspects, an apparatus comprises: means for performing one or more measurements of one or more reference signals configured for a user equipment (UE); means for triggering transmission of a channel state information (CSI) report during a discontinuous reception (DRX) cycle; and means for transmitting to a base station (BS), the CSI report based on the triggering, the CSI report including the one or more measurements.

In some aspects, an apparatus comprises: means for determining during a discontinuous reception (DRX) inactive time, to transmit a channel state information (CSI) report; and means for transmitting to a base station (BS), the CSI report based on the determining.

In some aspects, an apparatus comprises: a processor configured to configure, by a base station (BS), one or more discontinuous reception (DRX) cycles for a user equipment (UE); and a transceiver configured to receive, by the BS from the UE, a channel state information (CSI) report from the UE when the BS has no downlink (DL) data scheduled for the UE in a next occurrence of a DRX cycle.

In some instances, the transceiver is configured to transmit, by the BS, one or more reference signals configured for the UE, and wherein the CSI report is based on the one or more measurements.

In some instances, the transceiver is configured to receive the CSI report while the UE is not in a DRX active time and during a DRX on-duration of the DRX cycle.

In some instances, the transceiver is configured to transmit, by the BS to the UE, a wake-up signal (WUS) indicating that the UE is not scheduled for reception of DL data in a next occurrence of a DRX on-duration.

In some instances, the transceiver is configured to: receive, by the BS from the UE, a scheduling request; transmit, by the BS to the UE, an uplink (UL) grant in response to the scheduling request; and receive the CSI report based on the UL grant and while the UE is in the DRX active time.

In some instances, the transceiver is configured to receive the CSI report over one or more configured Physical Uplink Control Channel (PUCCH) resources.

In some instances, the processor is configured to detect, by the BS, that the UE's radio link quality has dropped below a threshold based on the CSI report; and the transceiver is configured to transmit a command to reconfigure the UE's serving beam or candidate beam in response to a detection that the UE's radio link quality has dropped below the threshold. In some instances, the BS configures the threshold.

In some instances, the processor is configured to detect, by the BS, a failure in a serving beam of the UE based on the CSI report; and the transceiver is configured to transmit a command to reconfigure the UE's serving beam or candidate beam in response to the detecting.

In some instances, the processor is configured to configure, by the BS, the UE to transmit a CSI report after a given number of DRX cycles has elapsed; and the transceiver is configured to receive the CSI report after the given number of DRX cycles has elapsed.

In some instances, the transceiver is configured to: transmit, by the BS to the UE, a WUS indicating the UE to enter a wake state to transmit the CSI report; and receive the CSI report in response to the transceiver transmitting the WUS. In some instances, the WUS indicates that the UE is not scheduled for reception of DL data in a next occurrence of a DRX on-duration.

In some instances, the transceiver is configured to: transmit, by the BS to the UE, a WUS indicating that the UE is not scheduled for reception of DL data in a next occurrence of a DRX on-duration of a DRX cycle; and receive the CSI report while the UE is in the DRX active time, wherein the CSI report includes CSI without RSRP.

In some instances, the transceiver is configured to transmit, by the BS to the UE, a CSI reporting configuration indicating that CSI with RSRP is not configured with a threshold.

In some aspects, a non-transitory computer-readable medium having program code recorded thereon is provided, the program code comprising: code for causing a base station (BS) to configure one or more discontinuous reception (DRX) cycles for a user equipment (UE); and code for causing the BS to receive from the UE, a channel state information (CSI) report from the UE when the BS has no downlink (DL) data scheduled for the UE in a next occurrence of a DRX cycle.

In some aspects, an apparatus comprises: means for configuring one or more discontinuous reception (DRX) cycles for a user equipment (UE); and means for receiving from the UE, a channel state information (CSI) report from the UE when the UE is not scheduled for reception of DL data in the next occurrence of a DRX cycle.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely some examples thereof, but rather, should be fully commensurate with that of the claims appended hereafter and their functional equivalents.

What is claimed is:

1. A method of wireless communication performed by a user equipment (UE), the method comprising:
receiving a wake-up signal (WUS) indicating:
the UE is not scheduled for reception of downlink (DL) data in a next occurrence of a DRX on-duration; and
a request for a channel state information (CSI) report;
determining, during a discontinuous reception (DRX) inactive time, to transmit a channel state information (CSI) report; and
transmitting, based at least in part on the request indicated in the WUS, the CSI report in a low power wake state, wherein the low power wake state is in between the DRX inactive time and a DRX active time.

2. The method of claim 1, further comprising:
receiving a CSI reporting configuration indicating at least one of a CSI with a reference signal received power (RSRP) or a CSI without the RSRP; and
wherein the transmitting the CSI report comprises at least one of:
transmitting, based on the CSI reporting configuration, the CSI report with the RSRP;
transmitting, based on the CSI reporting configuration, the CSI report without the RSRP; or
transmitting, based on the CSI reporting configuration, a first CSI report with the RSRP and a second CSI report without the RSRP.

3. The method of claim 1, further comprising:
detecting that a given number of DRX cycles has elapsed, wherein the given number of DRX cycles is configured; and
entering the DRX active time to transmit a second CSI report in response to detecting that the given number of DRX cycles has elapsed, wherein determining to transmit the second CSI report includes determining to transmit the second CSI report in response to detecting that the given number of DRX cycles has elapsed.

4. The method of claim 1, wherein determining to transmit the CSI report includes determining to transmit the CSI report in the low power wake state outside of the DRX active time in response to receiving the WUS.

5. The method of claim 4, comprising:
entering, during the next occurrence of the DRX on-duration of a DRX cycle, the low power wake state based on the WUS, wherein the UE remains in the low power wake state during the next occurrence of the DRX on-duration, wherein transmitting the CSI report includes transmitting the CSI report while the UE is in the low power wake state.

6. The method of claim 1, further comprising:
performing one or more measurements of one or more reference signals configured for the UE, wherein the CSI report is based on the one or more measurements.

7. The method of claim 1, further comprising:
receiving a CSI reporting configuration indicating that the CSI report with reference signal received powers (RSRP) is not configured with a threshold; and
determining, during a next DRX inactive time, to not transmit a second CSI report based on the CSI reporting configuration.

8. A user equipment (UE), comprising:
one or more memories;
one or more processors coupled to the one or more memories, the one or more memories storing instructions that are executable by the one or more processors, individually or in any combination, to cause the UE to:
receive a wake-up signal (WUS) indicating:
the UE is not scheduled for reception of downlink (DL) data in a next occurrence of a DRX on-duration; and
a request for a channel state information (CSI) report;
determine, during a discontinuous reception (DRX) inactive time, to transmit a channel state information (CSI) report; and
transmit, based at least in part on the request indicated in the WUS, the CSI report in a low power wake state, wherein the low power wake state is in between the DRX inactive time and a DRX active time.

9. The UE of claim 8, wherein the one or more processors are further configured, individually or in any combination, to cause the UE to:
receive a CSI reporting configuration indicating at least one of a CSI with a reference signal received power (RSRP) or a CSI without the RSRP; and
at least one of:
transmit, based on the CSI reporting configuration, the CSI report with the RSRP;
transmit, based on the CSI reporting configuration, the CSI report without the RSRP; or
transmit, based on the CSI reporting configuration, a first CSI report with the RSRP and a second CSI report without the RSRP.

10. The UE of claim 8, wherein the one or more processors are further configured, individually or in any combination, to cause the UE to:
detect that a given number of DRX cycles has elapsed, wherein the given number of DRX cycles is configured; and
enter the DRX active time to transmit a second CSI report in response to detecting that the given number of DRX cycles has elapsed, wherein determining to transmit the second CSI report includes determining to transmit the second CSI report in response to detecting that the given number of DRX cycles has elapsed.

11. The UE of claim 8, wherein the one or more processors are further configured, individually or in any combination, to cause the UE to:
determine to transmit the CSI report in the low power wake state outside of the DRX active time in response to receiving the WUS.

12. The UE of claim 11, wherein the one or more processors are further configured, individually or in any combination, to cause the UE to:
enter, during the next occurrence of the DRX on-duration of a DRX cycle, the low power wake state based on the WUS, wherein the UE remains in the low power wake state during the next occurrence of the DRX on-duration, wherein transmitting the CSI report includes transmitting the CSI report while the UE is in the low power wake state.

13. The UE of claim 8, wherein the one or more processors are further configured, individually or in any combination, to cause the UE to:
perform one or more measurements of one or more reference signals configured for the UE, wherein the CSI report is based on the one or more measurements.

14. The UE of claim 8, wherein the one or more processors are further configured, individually or in any combination, to cause the UE to:
receive a CSI reporting configuration indicating that the CSI report with reference signal received powers (RSRP) is not configured with a threshold; and determine, during a next DRX inactive time, to not transmit a second CSI report based on the CSI reporting configuration.

15. A user equipment (UE), comprising:
means for receiving awake-up signal (WUS) indicating:
the UE is not scheduled for reception of downlink (DL) data in a next occurrence of a DRX on-duration; and
a request for a channel state information (CSI) report;
means for determining, during a discontinuous reception (DRX) inactive time, to transmit a channel state information (CSI) report; and
means for transmitting, based at least in part on the request indicated in the WUS, the CSI report in a low power wake state, wherein the low power wake state is in between the DRX inactive time and a DRX active time.

16. The UE of claim 15, further comprising:
means for receiving a CSI reporting configuration indicating at least one of a CSI with a reference signal received power (RSRP) or a CSI without the RSRP; and
means for at least one of:
transmitting, based on the CSI reporting configuration, the CSI report with the RSRP;
transmitting, based on the CSI reporting configuration, the CSI report without the RSRP; or
transmit, based on the CSI reporting configuration, a first CSI report with the RSRP and a second CSI report without the RSRP.

17. The UE of claim 15, further comprising:
means for detecting that a given number of DRX cycles has elapsed, wherein the given number of DRX cycles is configured; and
means for entering the DRX active time to transmit a second CSI report in response to detecting that the given number of DRX cycles has elapsed, wherein determining to transmit the second CSI report includes determining to transmit the second CSI report in response to detecting that the given number of DRX cycles has elapsed.

18. The UE of claim 15, further comprising:
means for determining to transmit the CSI report in the low power wake state outside of the DRX active time in response to receiving the WUS.

19. The UE of claim 18, further comprising:
means for entering, during the next occurrence of the DRX on-duration of a DRX cycle, the low power wake state based on the WUS, wherein the UE remains in the low power wake state during the next occurrence of the DRX on-duration, wherein transmitting the CSI report includes transmitting the CSI report while the UE is in the low power wake state.

20. The UE of claim 15, further comprising:
means for performing one or more measurements of one or more reference signals configured for the UE, wherein the CSI report is based on the one or more measurements.

21. The UE of claim 15, further comprising:
means for receiving a CSI reporting configuration indicating that the CSI report with reference signal received powers (RSRP) is not configured with a threshold; and
means for determining, during a next DRX inactive time, to not transmit a second CSI report based on the CSI reporting configuration.

22. A non-transitory computer-readable medium having program code recorded thereon for wireless communication by a user equipment (UE), the program code comprising:

code for causing the UE to receive awake-up signal (WUS) indicating:
the UE is not scheduled for reception of downlink (DL) data in a next occurrence of a DRX on-duration; and
a request for a channel state information (CSI) report;
code for causing the UE to determine, during a discontinuous reception (DRX) inactive time, to transmit a channel state information (CSI) report; and
code for causing the UE to transmit, based at least in part on the request indicated in the WUS, the CSI report in a low power wake state, wherein the low power wake state is in between the DRX inactive time and a DRX active time.

23. The non-transitory computer-readable medium of claim 22, the program code further comprising:
code for causing the UE to receive a CSI reporting configuration indicating at least one of a CSI with a reference signal received power (RSRP) or a CSI without the RSRP; and
code for causing the UE to at least one of:
transmit, based on the CSI reporting configuration, the CSI report with the RSRP;
transmit, based on the CSI reporting configuration, the CSI report without the RSRP; or
transmit, based on the CSI reporting configuration, a first CSI report with the RSRP and a second CSI report without the RSRP.

24. The non-transitory computer-readable medium of claim 22, the program code further comprising:
code for causing the UE to detect that a given number of DRX cycles has elapsed, wherein the given number of DRX cycles is configured; and
code for causing the UE to enter the DRX active time to transmit a second CSI report in response to detecting that the given number of DRX cycles has elapsed, wherein determining to transmit the second CSI report includes determining to transmit the second CSI report in response to detecting that the given number of DRX cycles has elapsed.

25. The non-transitory computer-readable medium of claim 22, the program code further comprising:
code for causing the UE to determine to transmit the CSI report in the low power wake state outside of the DRX active time in response to receiving the WUS.

26. The non-transitory computer-readable medium of claim 25, the program code further comprising:
code for causing the UE to enter, during the next occurrence of the DRX on-duration of a DRX cycle, the low power wake state based on the WUS, wherein the UE remains in the low power wake state during the next occurrence of the DRX on-duration, wherein transmitting the CSI report includes transmitting the CSI report while the UE is in the low power wake state.

27. The non-transitory computer-readable medium of claim 22, the program code further comprising:
code for causing the UE to perform one or more measurements of one or more reference signals configured for the UE, wherein the CSI report is based on the one or more measurements.

28. The non-transitory computer-readable medium of claim 22, the program code further comprising:
- code for causing the UE to receive a CSI reporting configuration indicating that the CSI report with reference signal received powers (RSRP) is not configured with a threshold; and code for causing the UE to determine, during a next DRX inactive time, to not transmit a second CSI report based on the CSI reporting configuration.

\* \* \* \* \*